US008428841B2

(12) United States Patent
Kudo et al.

(10) Patent No.: US 8,428,841 B2
(45) Date of Patent: Apr. 23, 2013

(54) VEHICLE MOTION CONTROL DEVICE

(75) Inventors: Ken Kudo, Kariya (JP); Masato Terasaka, Ichinomiya (JP); Takuo Kitano, Chiryu (JP)

(73) Assignee: Advics Co., Ltd., Kariya-Shi, Aichi-Ken (JP)

( * ) Notice: Subject to any disclaimer, the term of this patent is extended or adjusted under 35 U.S.C. 154(b) by 400 days.

(21) Appl. No.: 12/894,656

(22) Filed: Sep. 30, 2010

(65) Prior Publication Data

US 2011/0077834 A1  Mar. 31, 2011

(30) Foreign Application Priority Data

Sep. 30, 2009 (JP) ................. 2009-227194

(51) Int. Cl.
*B60T 8/24* (2006.01)
*B60T 7/12* (2006.01)
*G06F 7/00* (2006.01)

(52) U.S. Cl.
USPC ............... 701/72; 701/73; 701/74; 701/78; 701/79; 701/80; 701/83; 701/88

(58) Field of Classification Search .................. None
See application file for complete search history.

(56) References Cited

U.S. PATENT DOCUMENTS

| | | | | |
|---|---|---|---|---|
| 5,944,393 A | * | 8/1999 | Sano | 303/146 |
| 6,219,610 B1 | * | 4/2001 | Araki | 701/72 |
| 6,415,215 B1 | * | 7/2002 | Nishizaki et al. | 701/70 |
| 6,470,250 B2 | * | 10/2002 | Nishizaki et al. | 701/48 |
| 6,658,343 B1 | * | 12/2003 | Ullmann et al. | 701/71 |
| 6,842,683 B2 | * | 1/2005 | Kim | 701/70 |
| 7,072,755 B2 | * | 7/2006 | Mahlo et al. | 701/71 |
| 7,104,615 B2 | * | 9/2006 | Kato et al. | 303/146 |
| 7,125,086 B2 | * | 10/2006 | Tanaka et al. | 303/190 |
| 7,568,773 B2 | * | 8/2009 | Nomura et al. | 303/115.5 |
| 7,661,772 B2 | * | 2/2010 | Heinemann | 303/146 |

FOREIGN PATENT DOCUMENTS

JP    5-319238 A    12/1993

* cited by examiner

*Primary Examiner* — Khoi Tran
*Assistant Examiner* — Bao Long T Nguyen
(74) *Attorney, Agent, or Firm* — Buchanan Ingersoll & Rooney PC

(57) ABSTRACT

A vehicle motion control device is provided. The vehicle motion control device includes a steering angle deviation calculating unit which calculates a steering angle deviation of the vehicle, a frictional coefficient calculating unit which calculates each of road surface frictional coefficients for a traveling road surface of four wheels; and a pressure increasing and reducing controlling unit which performs a split control including applying a pressure increasing limitation of a pressure increasing control in an anti-skid control to a front wheel at a side of the traveling road surface having higher road surface frictional coefficient between the right and left wheels based on an absolute value of the steering angle deviation such that a pressure increasing gradient in the pressure increasing control is smaller as the absolute value is larger.

21 Claims, 12 Drawing Sheets

VEHICLE MOTION CONTROL DEVICE

CROSS REFERENCE TO RELATED APPLICATIONS

This application is based on and claims priority under 35 U.S.C. §119 to Japanese Patent Application 2009-227194, filed on Sep. 30, 2009, the entire content of which is incorporated herein by reference.

BACKGROUND

1. Field of the Invention

The present invention relates to a vehicle motion control device configured to secure stability of the vehicle by anti-skid brake system (ABS) control.

2. Description of Related Art

JP-A-Hei. 5-319238 discloses technology for removing instability caused by a difference in slip rate between left and right wheels of a vehicle during performing an ABS control on a split road surface where the left and right wheels are different from each other in friction coefficient (hereinafter, referred to as "road surface $\mu$" or "$\mu$") of a traveling road surface of the vehicle. Since the split road surface has a difference in road surface $\mu$ between the left and right wheels, the left and right wheels have a difference in braking force generated. This braking force difference causes yaw moment to lead to instability of the vehicle. Therefore, in JP-A-Hei. 5-319238, a target slip rate of the wheel is set for the road surface where the road surface $\mu$ is higher (hereinafter, referred to as "high $\mu$ road") such that the braking force difference is offset between the left and right wheels depending on a yaw rate deviation that is a difference between a target yaw rate and an actual yaw rate. Accordingly, the braking force on the side of the high $\mu$ road can be reduced, and thus the braking force of the wheels on the side of the high $\mu$ road approaches that of the wheel on the road surface where the road surface $\mu$ is lower (hereinafter, referred to as "low $\mu$ road"), so that it is possible to reduce the yaw moment caused by the braking force difference and thus to improve the vehicle instability.

In the ABS control, the pressure variation gradient of a wheel cylinder (hereinafter, referred to as "W/C") in pulse pressure increasing, maintaining and reducing controls is set in advance regardless of the degree to which a driver steps a brake pedal. For this reason, timing when an actual slip rate exceeds the target slip rate set as mentioned above is based on vehicle speed variation changing depending on a preset pressure variation rate. Thus, although the yaw rate deviation occurs, the pressure reducing control is not started until the actual slip rate varying depending on a traveling environment exceeds the target slip rate. As a result, a difference in braking force between left and right wheels is generated, and thus high yaw moment is generated. Since a driver performs corrected steering (counter steering) to offset this yaw moment, opposite yaw moment is generated. Since this operation is repeated, it takes time to suppress an amplitude of the yaw rate deviation and an amplitude of a corrected steering angle in the corrected steering within a predetermined range. For this reason, it takes time until instability is removed, and thus a response characteristic is not sufficient.

Specifically, in the ABS control on the split road surface, the wheels on the side of the high $\mu$ on the split road surface are controlled while a slip rate control is generally performed by setting a slip rate, which is smaller than a slip rate at a $\mu$ peak in a relationship between the slip rate and the road surface $\mu$, as the target slip rate. In a characteristic diagram ($\mu$-s curve) showing the relationship between the slip rate and the road surface $\mu$, the road surface $\mu$ is increased until the slip rate reaches a predetermined value. When the slip rate reaches the predetermined value, the road surface $\mu$ reaches a peak ($\mu$ peak). Afterwards, the road surface $\mu$ is reduced as the increase of the slip rate. For this reason, in the case where the slip rate, which is smaller than the slip rate corresponding to the $\mu$ peak, is set to the target slip rate, although the pressure reducing control is started after the slip rate reaches the target slip rate, the actual slip rate exceeds the target slip rate to reach a higher slip rate due to a time lag between the start determination and the actual start. Thus, the braking force difference between the left and right wheels is generated as described above, and thus high yaw moment is generated.

In the above, the case where the high yaw moment is generated on the split road surface has been described. However, the same problem occurs in turning of the vehicle. The situation where the vehicle is subjected to understeer (hereinafter, abbreviated to "US") means the state where the vehicle exceeds a grip limit. This state is more likely to occur as the wheel slip becomes larger, and it is necessary to suppress the wheel slip to the target slip rate in the event of the US. Even in this case, the same problems as the case of the above-mentioned split road surface occur. For example, the pressure reducing control is not started until the actual slip rate exceeds the target slip rate.

SUMMARY

According to an aspect of the present invention, there is provided a vehicle motion control device capable of improving instability of the vehicle on a split road surface or in the event of US with a good response characteristic, so that corrected steering by a driver can be performed while maintaining the amplitude thereof within a predetermined range.

According to a first aspect of the present invention, there is provided a vehicle motion control device which performs an anti-skid control when a predetermined anti-skid starting condition is satisfied in any of four wheels (FL, FR, RL, RR) during braking of a vehicle, the anti-skid control including setting a control mode from either one of a pressure reducing mode and a pressure increasing mode based on a slip rate of each of the four wheels, and performing a pressure reducing control of reducing a wheel cylinder pressure and a pressure increasing control of increasing the wheel cylinder pressure based on the set control mode. The vehicle motion control device includes: a steering angle deviation calculating unit (110) which is configured to calculate a steering angle deviation (driftvalue) of the vehicle; a frictional coefficient calculating unit (100) which is configured to calculate each of road surface frictional coefficients of a traveling road surface of left wheels (FL and RL) among the four wheels and a traveling road surface of right wheels (FR and RR) among the four wheels; a split determining unit (125) which is configured to determine whether braking is performed on a split road surface where the road surface frictional coefficients between the left and right wheels are different from each other, based on a difference between the road surface frictional coefficients of the traveling road surfaces of the left wheels (FL and RL) and the right wheels (FR and RR) calculated by the frictional coefficient calculating unit (100); and a pressure increasing and reducing controlling unit (150) which is configured to perform a split control when the pressure increasing mode is set as the control mode, the spilt control including applying a pressure increasing limitation of the pressure increasing control in the anti-skid control to a front wheel at a side of the traveling road surface having higher road surface frictional coefficient between the right and left wheels based on an absolute value (|driftvalue|) of the steering angle deviation (driftvalue) calculated by the steering angle deviation calculating unit (110) such that a pressure increasing gradient in the pressure increasing control is smaller as the absolute value is larger.

In this manner, based on a magnitude of the absolute value (|driftvalue|) of the steering angle deviation (driftvalue) which is an index of stability of the vehicle, the pressure increasing gradient of the pressure increasing control is limited in the ABS control over the front wheel on the side of high μ road. For this reason, it is possible to inhibit an increasing gradient of a braking force of the wheels on the side of high μ road with a good response characteristic. Since the braking force difference between the left and right wheels can be inhibited by this inhibition of the increasing gradient of the braking force, it is possible to inhibit the yaw moment caused by the braking force difference between the left and right wheels. Thus, the instability of the vehicle on the split road surface can be improved with a good response characteristic. In this manner, since the yaw moment caused by the braking force difference between the left and right wheels can be inhibited, it is possible to reduce corrected steering by a driver to offset the yaw moment as well. Further, since the yaw moment is inhibited, it is possible to maintain a constant steering angle, and thus it is possible to perform the corrected steering by the driver while maintaining the amplitude thereof within a predetermined range.

The vehicle motion control device may further include a pressure increasing limitation threshold value setting unit (145) which is configured to set a threshold value for determining whether the pressure increasing and reducing controlling unit (150) starts applying the pressure increasing limitation of the pressure increasing control, as a pressure increasing limitation threshold value (ThH). When the absolute value (|driftvalue|) of the steering angle deviation (driftvalue) calculated by the steering angle deviation calculating unit (110) exceeds the pressure increasing limitation threshold value (ThH), the pressure increasing and reducing controlling unit (150) may apply the pressure increasing limitation of the pressure increasing control in the anti-skid control.

The vehicle motion control device may further include a vehicle speed calculating unit (100) which is configured to calculate a vehicle speed (V) of the vehicle. When the vehicle speed (V) calculated by the vehicle speed calculating unit (100) is a threshold value or smaller, the pressure increasing limitation threshold value setting unit (145) may set, as the pressure increasing limitation threshold value (ThH), a predetermined threshold value larger than a threshold value to be set when the vehicle speed (V) calculated by the vehicle speed calculating unit (100) is larger than the predetermined threshold value.

That is, when the vehicle speed (V) is low, vehicle stability is high. For this reason, by setting the pressure increasing limitation threshold value (ThH) to the larger value than the threshold value to be set when the vehicle speed (V) is larger the predetermined threshold value, it is possible to delay transition to the split control, and thus to obtain a higher braking force.

The pressure increasing and reducing controlling unit (150) may set a pressure increasing gradient limitation value (KDP) which becomes smaller as a separation degree between the absolute value (|driftvalue|) of the steering angle deviation (driftvalue) and the pressure increasing limitation threshold value (ThH) is larger, and the pressure increasing and reducing controlling unit (150) limits the pressure increasing gradient in the pressure increasing control to the pressure increasing gradient limitation value (KDP) when the split control is performed.

The pressure increasing and reducing controlling unit (150) may perform, as the split control, a pressure reducing control of reducing the wheel cylinder pressure on a front wheel at the side of the traveling road having higher road surface frictional coefficient between the left and right wheels when the pressure increasing mode is set as the control mode and when the absolute value of the steering angle deviation (driftvalue) calculated by the steering angle deviation calculating unit (110) exceeds a pressure reducing threshold value (ThD) which is larger than the pressure increasing limitation threshold value (ThH).

In this manner, when the vehicle stability is not improved only by limiting the pressure increasing gradient of the pressure increasing control in the ABS control as the split control, the pressure reducing control further reducing the W/C pressure is performed as the split control, it is possible to further promote improvement of the vehicle stability.

The vehicle motion control device may further include an independent controlling unit (230) which is configured to perform the anti-skid control on rear wheels among the four wheels independently between a right rear wheel and a left rear wheel when a predetermined time (T) has elapsed after the anti-skid control is started.

In this manner, a so-called select control, in which the ABS control is performed on both the rear wheel on the side of the high μ road and the rear wheel on the side of the low μ road, is not performed in all cases, but the independent ABS control may be performed on each of the left and right wheels when the predetermined time (T) has lapsed from the start of the ABS control. Thereby, it is possible to generate a higher braking force for the rear wheel on the side of the high μ road, and thus to maintain higher deceleration.

The vehicle motion control device may further include a turning direction determining unit (425) which is configured to determine a turning direction of the vehicle. The pressure increasing and reducing controlling unit (450) may perform a turn understeer specific control when the pressure increasing mode is set as the control mode, the turn understeer specific control including applying a pressure increasing limitation of the pressure increasing control in the anti-skid control to a front wheel at a turn outer side which is determined based on the turning direction determined by the turning direction determining unit (425), based on the absolute value (|driftvalue|) of the steering angle deviation (driftvalue) calculated by the steering angle deviation calculating unit (410) such that the pressure increasing gradient in the pressure increasing control is smaller as the absolute value is larger.

In this manner, in the event of the US, the turn US specific control equal to the split control may be performed. Thereby, it is possible to improve instability of the vehicle in the event of the US with a good response characteristic, and it is possible to perform corrected steering by a driver with its amplitude maintained within a predetermined range.

According to a second aspect of the present invention, there is provided a vehicle motion control device which performs an anti-skid control when a predetermined anti-skid starting condition is satisfied in any of four wheels (FL, FR, RL, RR) during braking of a vehicle, the anti-skid control including setting a control mode from either one of a pressure reducing mode and a pressure increasing mode based on a slip rate of each of the four wheels, and performing a pressure reducing control of reducing a wheel cylinder pressure and a pressure increasing control of increasing the wheel cylinder pressure based on the set control mode. The vehicle motion control device includes: a steering angle deviation calculating unit (410) which is configured to calculate a steering angle deviation (driftvalue) of the vehicle; a turning direction determining unit (425) which is configured to determine a turning direction of the vehicle; and a pressure increasing and reducing controlling unit (450) which is configured to perform a turn understeer specific control when the pressure increasing mode is set as the control mode, the turn understeer specific control including applying a pressure increasing limitation of the pressure increasing control in the anti-skid control to a front wheel at a turn outer side, which is determined based on the turning direction determined by the turning direction determining unit (425), based on an absolute value (|driftvalue|) of the steering angle deviation (driftvalue) calculated by the steering angle deviation calculating unit (410) such that a pressure increasing gradient in the pressure increasing control is smaller as the absolute value is larger.

It is noted that the symbols in the brackets of the respective units indicate the relationship corresponding to specific unit described in the Detailed Description.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION OF THE INVENTION

Hereinafter, illustrative embodiments of the present invention will now be described with reference to the drawings.

Meanwhile, in each illustrative embodiment below, parts having functions identical or equivalent to those of the other illustrative embodiments are indicated by the same reference symbols.

(First Illustrative Embodiment)

Figure 1:
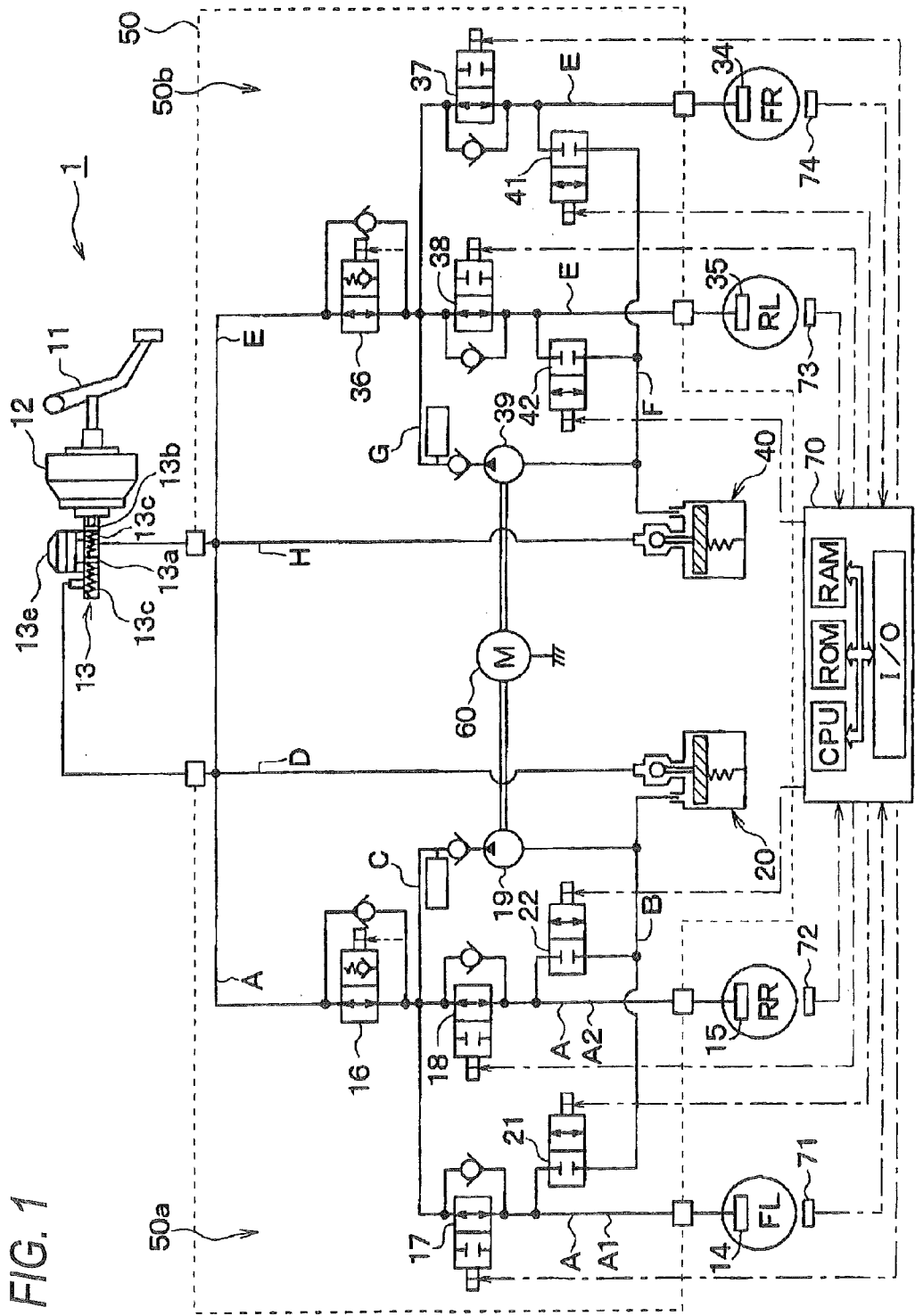
FIG. 1 shows the overall configuration of a brake control system 1 for a vehicle, which realizes vehicle motion control according to a first illustrative embodiment of the present invention.

A first illustrative embodiment of the present invention will be described. FIG. 1 shows the overall configuration of a brake control system 1 for a vehicle which realizes a vehicle motion control according to a first illustrative embodiment of the present invention. This brake control system 1 will be described regarding the case of performing an anti-skid braking system (ABS) control.

In FIG. 1, when a driver steps a brake pedal 11, a stepping force is boosted by a booster 12, and presses master pistons 13a and 13b installed on a master cylinder (hereinafter, referred to as "M/C") 13. Thereby, the same M/C pressure is generated in a primary chamber 13c and a secondary chamber 13d partitioned by these master pistons 13a and 13b. The M/C pressure is transmitted to each of wheel cylinders (W/C) 14, 15, 34 and 35 via an actuator 50 for controlling a brake fluid pressure.

Here, the M/C 13 is provided with a master reservoir 13e, which has lines communicating with the primary chamber 13c and the secondary chamber 13d, respectively.

The actuator 50 for controlling a brake fluid pressure includes a first piping system 50a and a second piping system 50b. The first piping system 50a controls the brake fluid pressure applied to a left front wheel FL and right rear wheel RR, whereas the second piping system 50b controls the brake fluid pressure applied to a right front wheel FR and left rear wheel RL.

Since the first piping system 50a has the same configuration as the second piping system 50b, the following description will be made to the first piping system 50a, but not to the second piping system 50b.

The first piping system 50a transmits the above-mentioned M/C pressure to the W/C 14 installed on the left front wheel FL and the W/C 15 installed on the right rear wheel RR, and includes a pipe line A serving as a main pipe line generating a W/C pressure.

Further, the pipe line A is provided with a first differential pressure control valve 16, which is able to control a communication state and a differential pressure state. This first differential pressure control valve 16 is configured so that its position is adjusted so as to be in the communication state when a driver operates the brake pedal 11, which is referred to as normal braking state (i.e., when a vehicle motion control is not performed). When current flows to a solenoid coil installed on the first differential pressure control valve 16, the position of the first differential pressure control valve 16 is adjusted such that the higher a current value becomes, the larger the differential pressure state becomes.

When the first differential pressure control valve 16 is in the differential pressure state, the brake fluid is allowed to flow only from the W/Cs 14 and 15 to the M/C 13 only when the brake fluid pressure on the side of the W/Cs 14 and 15 is higher than the M/C pressure to a predetermined extent. As such, the side of the W/Cs 14 and 15 is always kept so as not to exceed a predetermined pressure, compared to the side of the M/C 13.

The pipe line A branches off into two pipe lines A1 and A2 on the side of the W/Cs 14 and 15 that is farther downstream than the first differential pressure control valve 16. The pipe line A1 is provided with a first pressure increasing control valve 17, which controls an increase of the brake fluid pressure over the W/C 14, whereas the pipe line A2 is provided with a second pressure increasing control valve 18, which controls an increase of the brake fluid pressure over the W/C 15.

The first and second pressure increasing control valves 17 and 18 are configured of a two-position electromagnetic valve, which is able to control a communication and blockage state.

The first and second pressure increasing control valves 17 and 18 are designed in a normal open type in which they are controlled in the communication state when control current to solenoid coils installed thereon is zero (i.e. when no current flows) and in which they are controlled in the blockage state when control current flows to the solenoid coils (i.e. when any current flows).

A pipe line B as a pressure reducing pipe line, which connects between the first and second pressure increasing control valves 17 and 18 and the W/Cs 14 and 15 and the pressure adjusting reservoir 20, is provided with first and second pressure reducing control valves 21 and 22 configured by a two-position electromagnetic valve capable of controlling communication and blockage states. The first and second pressure reducing control valves 21 and 22 are designed in a normal close type.

A pipe line C serving as a reflow pipe line is installed between a pressure adjusting reservoir 20 and the pipe line A as the main pipe line. This pipe line C is provided with a self-suction pump 19, which is driven by a motor 60 so as to suction or discharge the brake fluid from the pressure adjusting reservoir 20 to either the M/C 13 or the W/Cs 14 and 15. The motor 60 is driven under the control of current conduction to a motor relay (not shown).

A pipe line D serving as an auxiliary pipe line is installed between the pressure adjusting reservoir 20 and the M/C 13. The brake fluid is suctioned from the M/C 13 and is discharged to the pipe line A via the pipe line D. Thereby, on controlling vehicle motion, the brake fluid is fed to the W/Cs 14 and 15, and thus increases the W/C pressure of the wheel to be controlled. Here, although the first piping system 50a has been described, the second piping system 50b has the same configuration as the first piping system 50a, and also includes the same parts as the first piping system 50a. Specifically, the second piping system 50b includes a second differential pressure control valve 36 corresponding to the first differential pressure control valve 16, third and fourth pressure increasing control valves 37 and 38 corresponding to the first and second pressure increasing control valves 17 and 18, third and fourth pressure reducing control valves 41 and 42 corresponding to the first and second pressure reducing control valves 21 and 22, a pump 39 corresponding to the pump 19, a reservoir 40 corresponding to the reservoir 20, and pipe lines E through H corresponding to the pipe lines A through D.

Figure 2:
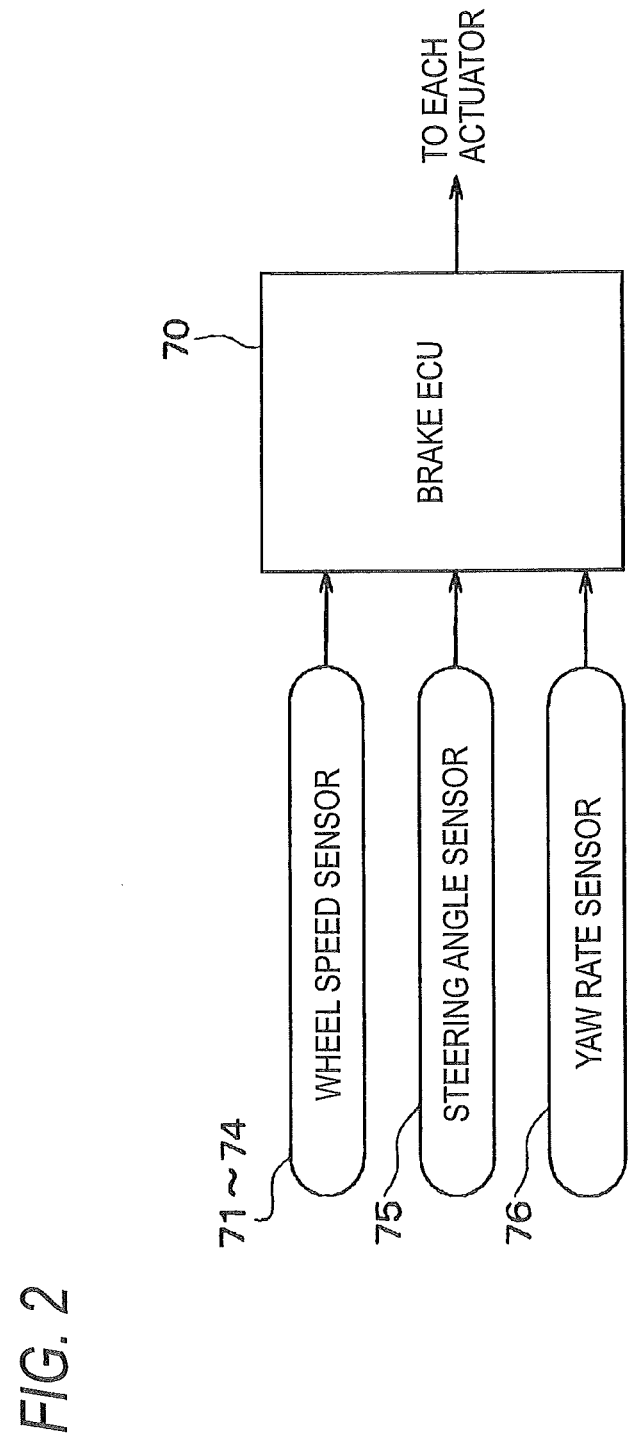
FIG. 2 is a flowchart showing a relationship between input and output of signals of a brake ECU 70.

Further, a brake electronic control unit (ECU) 70 is an example of a vehicle motion control device, controls the brake control system 1, includes a known micro computer having a central processing unit (CPU), a read only memory (ROM), a random access memory (RAM), etc., and performs a variety of operations based on programs stored in the ROM. FIG. 2 is a flowchart showing a relationship between input and output of signals of the brake ECU 70.

As shown in FIG. 2, the brake ECU 70 receives detection signals of wheel speed sensors 71 through 74 installed on the respective wheels FL through RR, a steering angle sensor 75, and a yaw rate sensor 76, and performs calculation of various physical quantities or the vehicle motion control such as an ABS control.

Next, the vehicle motion control performed by the brake ECU 70 installed on the brake control system 1 configured as mentioned above will be described in more detail. Meanwhile, the vehicle motion control capable of being performed by the brake ECU 70 includes a traction control, a transverse anti-skid control, and so on. Here, only the ABS control will be described.

Figure 3:
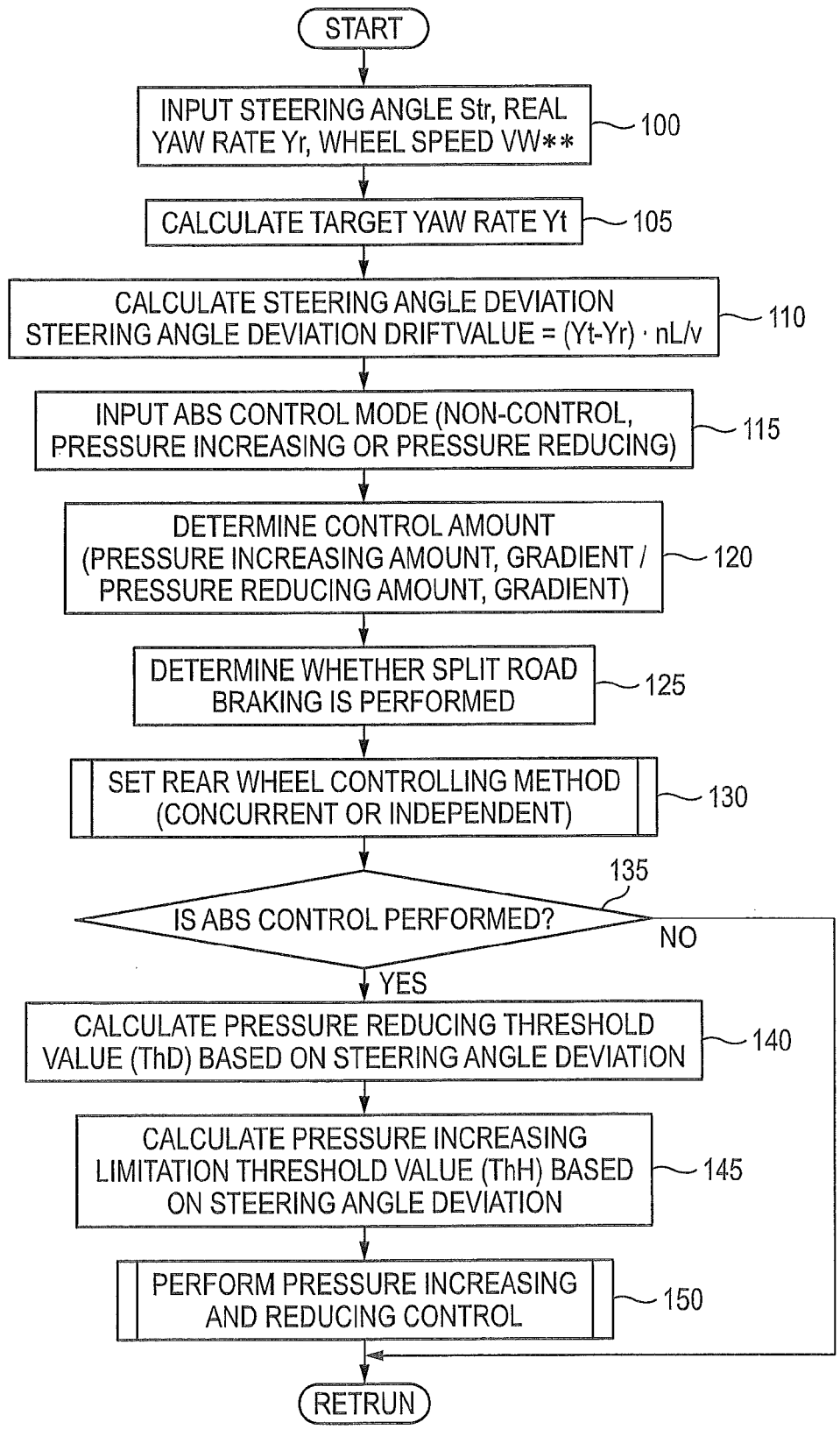
FIG. 3 is a flowchart showing details of a pressure increasing and reducing control in an ABS control performed by a brake ECU 70.

FIG. 3 is a flowchart showing details of a pressure increasing and reducing control in the ABS control performed by the brake ECU 70. The ABS control is a common control, and is started while adopting predetermined conditions such as a condition in which an actual slip rate exceeds a target slip rate, as ABS starting conditions. Afterwards, if the actual slip rate exceeds the target slip rate, the ABS control sets a pressure reducing mode. Then, the pressure reducing control is performed to recover a wheel speed, and thereby the actual slip rate is reduced, so that a pressure increasing mode is set such that the pressure increasing control is performed. In the ABS control, the pressure increasing or reducing control refers to control of increasing or reducing pressure based on the control mode set by the ABS control. The ABS control and pressure increasing or reducing control are performed at predetermined control periods, for instance, when it is determined that, after an ignition switch (not shown) is turned on, the brake pedal 11 is stepped, i.e. that the vehicle is in the course of braking. Hereinafter, the pressure increasing and reducing control will be described. However, a main flow of the ABS control is not different from that of the related art, and so description thereof will be omitted.

First, in step 100, the detection signals of the wheel speed sensors 71 through 74, the steering angle sensor 75, and the yaw rate sensor 76 are input, and a wheel speed $Vw^{}$ (where  refers to a superscript of each of the wheels FR, FL, RR and RL), a steering angle Str, and an actual yaw rate Yr are calculated from the respective detection signals. Here, calculation of the vehicle speed V or estimation of a road surface $\mu$ is also performed based on the wheel speed $Vw^{}$. A vehicle speed V is an estimated vehicle speed obtained by a well-known technique based on the wheel speeds, for instance, is the highest of the four wheel speeds or an average value of the three higher of the four wheel speeds. The estimation of the road surface $\mu$ may be performed by any well-known technique. For example, using a characteristic of the road surface $\mu$ relative to a slip rate represented by a difference between the vehicle speed V and the wheel speed $Vw^{}$, the slip rate is calculated from the calculated vehicle speed V and wheel speed $Vw^{**}$, and then the road surface $\mu$ may be estimated from the characteristic of the road surface $\mu$ relative to the slip rate.

Next, in step 105, a yaw rate assumed in an ideal turning state where no slip occurs is calculated as a target yaw rate Yt. For example, the target yaw rate Yt may be calculated by a known technique based on the steering angle Str and the vehicle speed V, both of which are calculated in step 100. Then, it proceeds to step 110.

In step 110, a steering angle deviation 'driftvalue' is calculated. The steering angle deviation 'driftvalue' may be calculated using the following equation based on a difference between the target yaw rate Yt calculated in step S105 and the actual yaw rate Yr calculated in step S100, a steering gear ratio n, a length L between wheelbases, and the vehicle speed V.

$$\text{driftvalue} = (Yt - Yr) \cdot nL/V \qquad \text{(Equation 1)}$$

In the following step 115, a control mode for the ABS control is input. Specifically, as described above, in the main flow of the ABS control, the pressure increasing mode, the pressure reducing mode, or a non-control mode where neither the pressure increasing mode nor the pressure reducing mode is set is set. Accordingly, it is input which one of the pressure increasing mode, the pressure reducing mode, and the non-control mode is set. Meanwhile, in the ABS control, there is a control type where a maintaining mode is set as needed. Here, although the case in which there is no maintaining mode is described, the ABS control may have a control type where the maintaining mode is set.

Afterwards, it proceeds to step 120, and an increasing amount and a gradient of the W/C pressure in the pressure increasing control and a reducing amount and a gradient of the W/C pressure in the pressure reducing control are determined. This processing is also known from the related art. For example, based on a vehicle deceleration dV calculated from the vehicle speed V or the road surface μ estimated in step 100, the timing of pulse rise or a time to perform the pulse increase in the pressure increasing control and a pressure reducing time in the pressure reducing control are set, so that the increasing amount of pressure, the reducing amount of pressure, and their gradients can be determined.

Then, in step 125, it is determined whether split road braking is being performed. Specifically, it is determined whether braking is performed on the split road surface. For example, a difference between the road surfaces μ of the left and right wheels is calculated using the road surface μ estimated in step 100. In the case where the difference exceeds a predetermined range, i.e., in the case where an absolute value of the difference exceeds a predetermined threshold value, it is determined to be the braking on the split road surface. When it is determined that the braking is performed on the split road surface, a flag indicating that effect is set.

Figure 4:
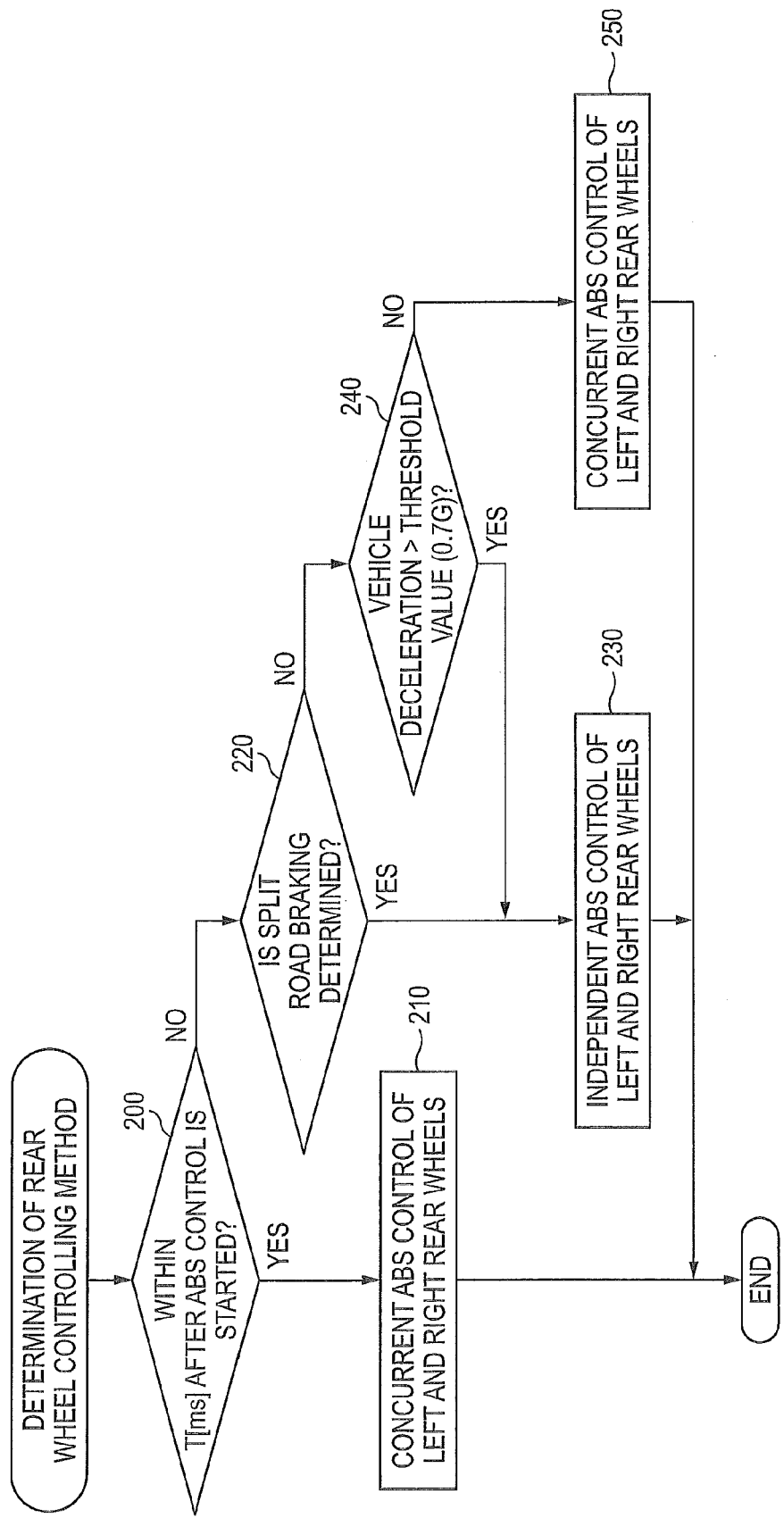
FIG. 4 is a flowchart showing details of a rear wheel controlling method.

In step 130, a rear wheel controlling method is set. The rear wheels RL and RR have a high contribution to the stability of the vehicle. The control on the rear wheels RL and RR is performed while associating with the left and right wheels, so that the stability of the vehicle can be further improved. This processing will be described with reference to FIG. 4. FIG. 4 is a flowchart showing details of a rear wheel controlling method.

As shown in FIG. 4, first, in step 200, it is determined whether a time after the ABS control starts is within a predetermined time T [ms]. This time T is measured by starting count-up using a counter (not shown) in the brake ECU 70, for instance, when a starting condition of the ABS control is satisfied in the main flow of the ABS control. In the case where this determination is YES, it proceeds to step 210, a concurrent ABS control of the left and right rear wheels, in which the ABS control is performed on the left and right rear wheels RL and RR at the same time, is set.

Specifically, since corrected steering may be applied by a driver when the ABS control starts, although the steering angle deviation 'driftvalue' is generated, it is impossible to discriminate whether the steering angle deviation is correct. Thus, the ABS control based on such a steering angle deviation 'driftvalue' lacks its stability. For this reason, the concurrent ABS control of the left and right rear wheels is set when only a slight time has lapsed from the start of the ABS control such that an independent control is performed only when the steering angle deviation 'driftvalue' is a correct value. Meanwhile, the concurrent ABS control of the left and right rear wheels is a so-called select low control, in which regardless of whether the wheel on the side of a high μ road satisfies the starting condition of the ABS control when the ABS control starts for the wheel of a low μ road, the pressure reducing control in the ABS control is started for the wheel of the high μ along with the wheel of the low μ.

Meanwhile, in the case when the determination in step 200 is NO, it proceeds to step 220, and it is determined whether the split road surface braking is being performed. This processing is determined based on a result of the determination of step 125 in FIG. 3 as mentioned above. If a flag indicating the effect that the split road surface braking is being performed is set, the determination is YES. And, if the split road surface braking is being determined, it proceeds to step 230, and an independent ABS control of the left and right rear wheels is set so as to independently perform the ABS control on the left and right rear wheels RL and RR.

Further, if the split road surface braking is not being performed, it proceeds to step 240, and it is determined whether the vehicle deceleration dV exceeds a threshold value (e.g., 0.7 G). By this processing, it may be determined whether a traveling road surface is a high μ road. Specifically, if the traveling road surface is the high μ road, high deceleration can be obtained to some extent. As such, when the vehicle deceleration dV exceeds the threshold value, it is determined that the vehicle is traveling on the high μ road. Further, if the traveling road surface is the high μ road, it proceeds to step 230, the independent ABS control of the left and right rear wheels is set. If the traveling road surface is the low μ road, it proceeds to step 250, the concurrent ABS control of the left and right rear wheels is set.

In this manner, the related art is configured so that the independent ABS control of the left and right rear wheels is performed only in the case of the high μ road, while the present illustrative embodiment is configured so that the independent ABS control of the left and right rear wheels is performed on the high μ road as well as the split road surface. Thus, in comparison with the case of performing the concurrent ABS control of the left and right rear wheels on the rear wheels RL and RR, the ABS control is performed at a high slip rate nearer to a μ peak, so that it is possible to obtain a higher braking force.

When the rear wheel controlling method ends by this processing, it is determined whether the ABS control is being performed in step 135 of FIG. 3. For example, in the main flow of the ABS control, when the starting condition of the ABS control is satisfied to start the ABS control, the ABS control flag indicating this start is set. Therefore, the determination may be performed by checking this ABS control flag. Here, if the determination is YES, it proceeds to the subsequent processing. If the determination is NO, the ABS control ends in that state.

If the determination in step 135 is YES, it proceeds to steps 140 and 145, and calculations of a pressure reducing threshold value ThD and a pressure increasing limitation threshold value ThH are sequentially performed based on the steering angle deviation 'driftvalue'.

Specifically, in the present illustrative embodiment, when the ABS control is performed on the split road surface, the pressure reducing control or the pressure increasing control is performed as a control corresponding to the split road surface (hereinafter, referred to as "split control"). In the case of the present illustrative embodiment, the pressure reducing threshold value ThD is a threshold value for determining the start of performing the pressure reducing control in the split control, and the pressure increasing limitation threshold value ThH is a threshold value for determining the start of performing pressure increasing limitation in the split control.

Specifically, when a yaw moment is generated to deteriorate the vehicle stability due to a braking force difference between the left and right wheels on the split road surface, the absolute value |driftvalue| of the steering angle deviation 'driftvalue' becomes larger. For this reason, if the pressure increasing gradient of the W/C pressure in the pressure increasing control is kept high, the braking force difference between the two wheels is not reduced, and thus the vehicle stability is still more deteriorated. Thus, the pressure increasing limitation threshold value ThH is set, and the pressure increasing gradient of the W/C pressure in the pressure increasing control of the split control is limited when the absolute value |driftvalue| of the steering angle deviation 'driftvalue' exceeds the pressure increasing limitation threshold value ThH.

Furthermore, even when the pressure increasing gradient of the W/C pressure in the pressure increasing control of the split control is limited by the pressure increasing limitation threshold value ThH, the vehicle stability may be further deteriorated. In this case, since the limitation on the pressure increasing gradient of the W/C pressure is insufficient, the pressure reducing control may be performed as the split control, thereby reducing the braking force difference between the two wheels. Thus, the pressure reducing threshold value ThD is set, and the pressure reducing control is performed as the split control when the absolute value |driftvalue| of the steering angle deviation 'driftvalue' exceeds the pressure reducing threshold value ThD.

For determining the start of performing the pressure increasing gradient limitation in this split control, i.e. the pressure increasing control or the start of performing the pressure reducing control, the pressure increasing limitation threshold value ThH or the pressure reducing threshold value ThD is set. In the present illustrative embodiment, as the pressure increasing limitation threshold value ThH or the pressure reducing threshold value ThD, a front wheel ThD, a front wheel ThH, a rear wheel ThD, and a rear wheel ThH are calculated. The front wheel ThD and the front wheel ThH are the pressure reducing threshold value ThD and the pressure increasing limitation threshold value ThH of the front wheels FL and FR, and the rear wheel ThD and the rear wheel ThH are the pressure reducing threshold value ThD and the pressure increasing limitation threshold value ThH of the rear wheels RL and RR.

Figure 5:
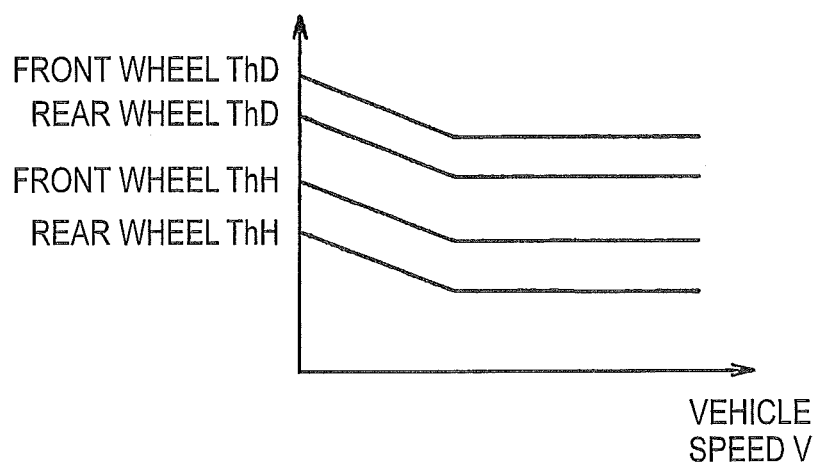
FIG. 5 is a map showing a relationship among a vehicle speed V, a pressure reducing threshold value ThD, and a pressure increasing limitation threshold value ThH.

For example, the front wheel ThD, the front wheel ThH, the rear wheel ThD, and the rear wheel ThH may be calculated based on the map showing the relationship among the vehicle speed V, the pressure reducing threshold value ThD, and the pressure increasing limitation threshold value ThH. As shown in FIG. 5, these front wheel ThD, front wheel ThH, rear wheel ThD, and rear wheel ThH decreases as the vehicle speed V increases when the vehicle speed V is smaller than the threshold value, and are constant when the vehicle speed V is larger than the threshold value. Since the vehicle stability is high when the vehicle speed V is low, transition to the split control is delayed by setting high values for the front wheel ThD, the front wheel ThH, the rear wheel ThD, and the rear wheel ThH such that a higher braking force is obtained.

Meanwhile, in the map shown in FIG. 5, when the front wheel ThD, the front wheel ThH, the rear wheel ThD, and the rear wheel ThH are calculated, the front wheel ThD and the rear wheel ThD are different from each other, and the front wheel ThH and the rear wheel ThH are also different from each other. Alternatively, a map in which all have the same value may be used. However, as described above, since the rear wheels RL and RR have a high contribution to the stability of the vehicle, the rear wheel ThD and the rear wheel ThH set for the rear wheels RL and RR may be lower than the front wheel ThD and the front wheel ThH set for the front wheels FL and FR. Thereby, the pressure increasing limitation or the pressure reducing control starts to be performed on the rear wheel RL and RR prior to the front wheels FL and FR, so that the vehicle motion control can be preferentially performed on the rear wheels, and thus it is possible to further improve the stability. Further, without being limited to the case of using the map as shown in FIG. 5, the front wheel ThD, the front wheel ThH, the rear wheel ThD, and the rear wheel ThH may be calculated based on a function expression representing the relationship among the vehicle speed V, the pressure reducing threshold value ThD, and the pressure increasing limitation threshold value ThH.

Figure 6:
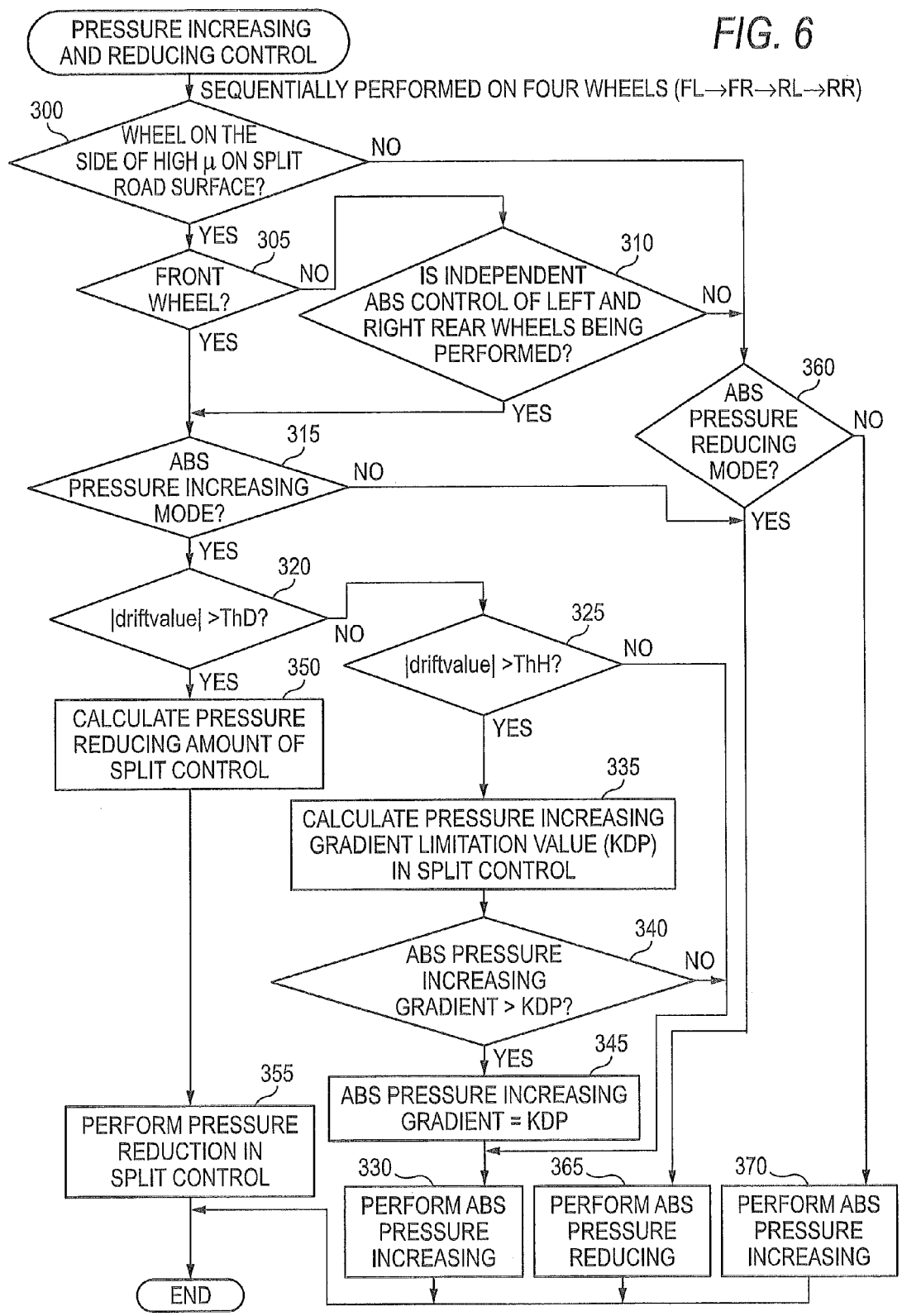
FIG. 6 is a flowchart showing details of a pressure increasing and reducing control.

Thereby, the calculations of the pressure reducing threshold value ThD and the pressure increasing limitation threshold value ThH ends. Then, it proceeds to step 150, and the pressure increasing and reducing control is performed. This processing will be described with reference to FIG. 6. FIG. 6 is a flowchart showing details of a pressure increasing and reducing control. The pressure increasing and reducing control described here is individually performed on each of the wheels FL through RR, and are performed from the front wheel FL to the rear wheel RR in turn.

First, in step 300, it is determined whether a wheel is on the side of the high μ road of the split road surface. Specifically, based on the road surface μ estimated in step 100 of FIG. 3, it is determined whether a wheel which is a target of the current pressure increasing and reducing control corresponds to a wheel on the side of the high μ road of the split road surface. Here, if the determination is YES, it proceeds to step 305, and it is determined whether the wheel which is a target of the current pressure increasing and reducing control is the front wheel, i.e. the front wheel on the side of the high μ road. Here, if the wheel is not the front wheel, it proceeds to step S310. If the wheel is the front wheel, it proceeds to step S315.

In step 310, it is determined whether the independent ABS control of the left and right rear wheels is being performed. In this processing, the determination is YES if the independent ABS control of the left and right rear wheels is set in step 230 of FIG. 4 mentioned above, and is NO if the concurrent control of the left and right rear wheels is set in step 210 or 250. Here, even when the determination is YES, it proceeds to step 315.

In step 315, it is determined whether a pressure increasing mode is set in the ABS control. This prevents the pressure increasing control from being performed although the pressure reducing mode is set.

In step 320, it is determined whether the absolute value |driftvalue| of the steering angle deviation 'driftvalue' exceeds the pressure reducing threshold value ThD set in step 140 of FIG. 3. Specifically, the absolute value |driftvalue| of the steering angle deviation 'driftvalue' is calculated from the steering angle deviation 'driftvalue' calculated in step 110 mentioned above, and the determination is made based on the absolute value |driftvalue|. In the case where the wheel which is a target of this pressure increasing and reducing control is the front wheel, the absolute value |driftvalue| is compared with the front wheel ThD. In the case where the wheel which is a target of this pressure increasing and reducing control is the rear wheel, the absolute value |driftvalue| is compared with the rear wheel ThD. Here, when it is short after the brake pedal 11 is stepped during traveling on the split road surface, the determination would be NO. This is because, after the brake pedal 11 is stepped, the braking force difference between the left and right wheels is gradually generated to increase instability of the vehicle, and the absolute value |driftvalue| of the steering angle deviation 'driftvalue' is not so large in the beginning when the braking force is generated.

For this reason, first, the determination in step 320 is NO, and it proceeds to step 325. Here, it is determined whether the absolute value |driftvalue| of the steering angle deviation 'driftvalue' exceeds the pressure increasing limitation threshold value ThH. This can be determined in the same manner as step 320 by comparing the absolute value |driftvalue| with the front wheel ThD when the wheel which is a target of this pressure increasing and reducing control is the front wheel, and by comparing the absolute value |driftvalue| with the rear wheel ThD when the wheel which is a target of this pressure increasing and reducing control is the rear wheel. Even in this case, when it is short after since the brake pedal 11 is stepped during traveling on the split road surface, the determination would be NO.

Thus, when it is short after the brake pedal 11 is stepped during traveling on the split road surface, it proceeds to step 330, and the pressure increasing control is performed in the ABS control without the limitation on pressure increasing gradient. Thereby, with respect to the wheel on the side of the high µ road of the traveling road surface, the W/C pressure is increased, and thus the braking force is increased.

Thereby, when the braking force of the wheel on the side of the high µ road is increased, the braking force difference between the left and right wheels is increased, and the resulting yaw moment becomes larger. Thereby, the absolute value |driftvalue| of the steering angle deviation 'driftvalue' exceeds the pressure increasing limitation threshold value ThH. For this reason, the determination in step 325 would be YES, and it proceeds to step 335 and the following steps. The pressure increasing limitation is performed in the split control.

Specifically, in step 335, a pressure increasing gradient limitation value KDP in the split control is calculated. This pressure increasing gradient limitation value KDP is a value that limits the pressure increasing gradient set as the pressure increasing control in the typical ABS control in order to inhibit the braking force difference between the left and right wheels to improve the vehicle stability. For example, the pressure increasing gradient limitation value KDP may be calculated using a map shown in FIG. 7.

Figure 7:
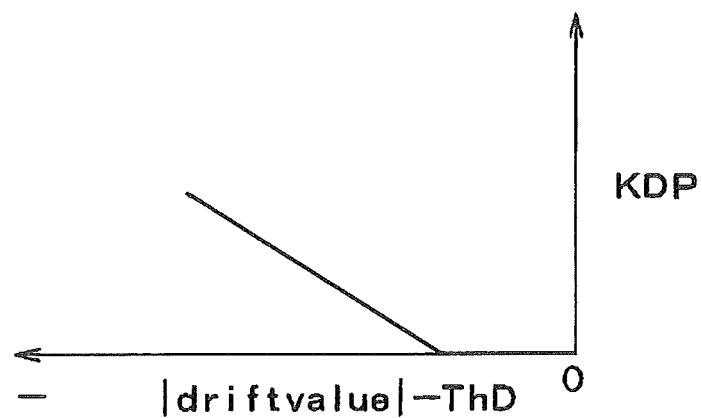
FIG. 7 is a map showing a relationship between a difference between the absolute value |driftvalue| of a steering angle deviation 'driftvalue' and the pressure reducing threshold value ThD, and a pressure increasing gradient limitation value KDP.

FIG. 7 is a map showing a relationship between a difference between the absolute value |driftvalue| of the steering angle deviation 'driftvalue' and the pressure reducing threshold value ThD and the pressure increasing gradient limitation value KDP. The difference between the absolute value |driftvalue| of the steering angle deviation 'driftvalue' and the pressure reducing threshold value ThD indicates a separation degree of the absolute value |driftvalue| of the steering angle deviation 'driftvalue' from the pressure increasing limitation threshold value ThH. Specifically, in the case where the absolute value |driftvalue| of the steering angle deviation 'driftvalue' is smaller than the pressure reducing threshold value ThD, as a difference between the absolute value |driftvalue| and the pressure reducing threshold value ThD becomes larger, the absolute value |driftvalue| becomes closer to the pressure increasing limitation threshold value ThH. This means that a large pressure increasing gradient can be set in the pressure increasing control. For this reason, as shown in FIG. 7, a value obtained by subtracting the pressure reducing threshold value ThD from the absolute value |driftvalue| of the steering angle deviation 'driftvalue' is a negative value. As such, the smaller the obtained value, the larger the pressure increasing gradient limitation value KDP. In other words, the larger the absolute value |driftvalue| of the steering angle deviation 'driftvalue', the smaller the pressure increasing gradient limitation value KDP becomes.

Meanwhile, in FIG. 7, even when the difference between the absolute value |driftvalue| of the steering angle deviation 'driftvalue' and the pressure reducing threshold value ThD exists to some extent, the pressure increasing gradient limitation value KDP becomes zero. This is because, if the pressure increasing control is performed although the pressure increasing gradient limitation value KDP is small up to just before the pressure reducing control starts, the W/C pressure may be overshot when the pressure increasing control transitions to the pressure reducing control. In this way, when the pressure increasing control is changed into the pressure reducing control, such a W/C pressure can be inhibited from being overshot by setting a range where the pressure increasing gradient limitation value KDP becomes zero.

When the pressure increasing gradient limitation value KDP is set, it proceeds to step 340, and it is determined whether the pressure increasing gradient limitation value KDP set in step 335 is larger than the preset pressure increasing gradient of the ABS control. Here, if the pressure increasing gradient limitation value KDP is larger than the preset pressure increasing gradient of the ABS control, the pressure increasing gradient is updated by setting the pressure increasing gradient limitation value KDP as a new pressure increasing gradient of the ABS control. Afterwards, it proceeds to step 330, the pressure increasing control in the ABS control is performed. Thereby, either the timing of pulse rise or the time to perform the pulse rise is adjusted in the pressure increasing control such that the pressure increasing gradient set at that time is obtained.

Thereby, either the pressure increasing control in the normal ABS control or the pressure increasing control in the split control is performed. With respect to the wheel on the side of the high µ road of the split road surface (but, with respect to the rear wheels, in the case where the independent ABS control of the left and right rear wheels is being performed), this pressure increasing control is repeated until the absolute value |driftvalue| of the steering angle deviation 'driftvalue' exceeds the pressure reducing threshold value ThD for a period when the pressure increasing mode of the ABS control is set.

Meanwhile, when the absolute value |driftvalue| of the steering angle deviation 'driftvalue' is further increased although the pressure increasing gradient limitation is applied in the pressure increasing control, the determination in step 320 is YES. In this case, it proceeds to step 350, and the pressure reducing control is performed in the split control. In particular, in step 350, a pressure reducing amount of the pressure reducing control in the split control is calculated. For example, the pressure reducing amount may be calculated using a map shown in FIG. 8.

Figure 8:
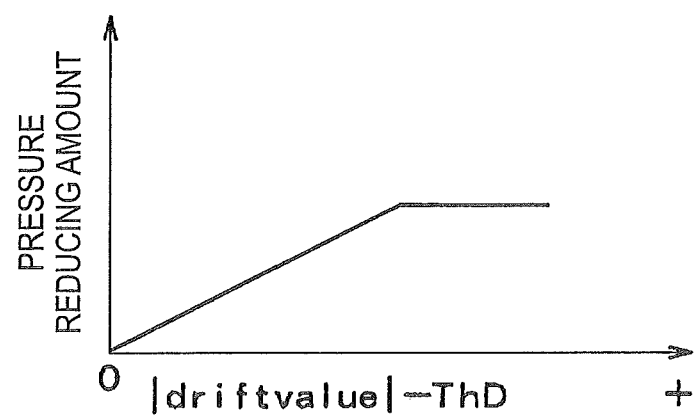
FIG. 8 is a map showing a relationship between a difference between the absolute value |driftvalue| of the steering angle deviation 'driftvalue' and a pressure increasing limitation threshold value ThH and a pressure reducing amount.

FIG. 8 is a map showing a relationship between a difference between the absolute value |driftvalue| of a steering angle deviation 'driftvalue' and a pressure reducing threshold value ThD and a pressure reducing amount. The difference between the absolute value |driftvalue| of the steering angle deviation 'driftvalue' and a pressure reducing threshold value ThD indicates a degree to which the vehicle is unstable. Although, the pressure reducing amount can be set to a constant value, the pressure reducing amount is preferably made larger as the absolute value |driftvalue| of the steering angle deviation 'driftvalue' becomes larger because a driver wishes to improve the vehicle stability by rapidly reducing the braking force difference between the left and right wheels in proportion to vehicle instability. For this reason, as shown in FIG. 8, as the difference between the absolute value |driftvalue| of the steering angle deviation 'driftvalue' and the pressure reducing threshold value ThD becomes larger, the pressure reducing amount becomes larger in proportion to the difference. When the difference between the absolute value |driftvalue| of the steering angle deviation 'driftvalue' and the pressure reducing threshold value ThD becomes large to some extent, the pressure reducing amount is made constant. Thereby, the W/C pressure is restricted so as not to be excessively reduced.

When the pressure reducing amount is set, it proceeds to step 355, and pressure reduction of the pressure reducing control in the split control is performed. Here, the pressure reduction is performed by adjusting a pressure reducing time so as to be the pressure reducing amount calculated in step 350. Thereby, the pressure reducing control in the split control is performed. With respect to the wheel on the side of the high μ road of the split road surface (but, with respect to the rear wheels, in the case where the independent ABS control of the left and right rear wheels is being performed), the pressure reducing control in this split control is repeated until the vehicle stability is improved to such an extent that the absolute value |driftvalue| of the steering angle deviation 'driftvalue' is smaller than the pressure reducing threshold value ThD for a period when the pressure increasing mode of the ABS control is set.

Further, in step 300 mentioned above, if it is determined that the wheel is not the wheel on the side of the high μ road of the split road surface, it proceeds to step 360, and it is determined whether the pressure reducing mode of the ABS control is set. This case is set for the ABS control over the wheels on the side of the low μ road of the split road surface. As such, if the determination is YES, it proceeds to step 365, and pressure reduction of the pressure reducing control in the typical ABS control is performed. If the determination is NO, it proceeds to step 370, and pressure increase of the pressure increasing control in the typical ABS control is performed.

By doing as described above, the pressure increasing and reducing control processing of step 150 of FIG. 3 ends, and the pressure increasing and reducing controls in the ABS control which the brake ECU 70 performs ends.

Figure 9:
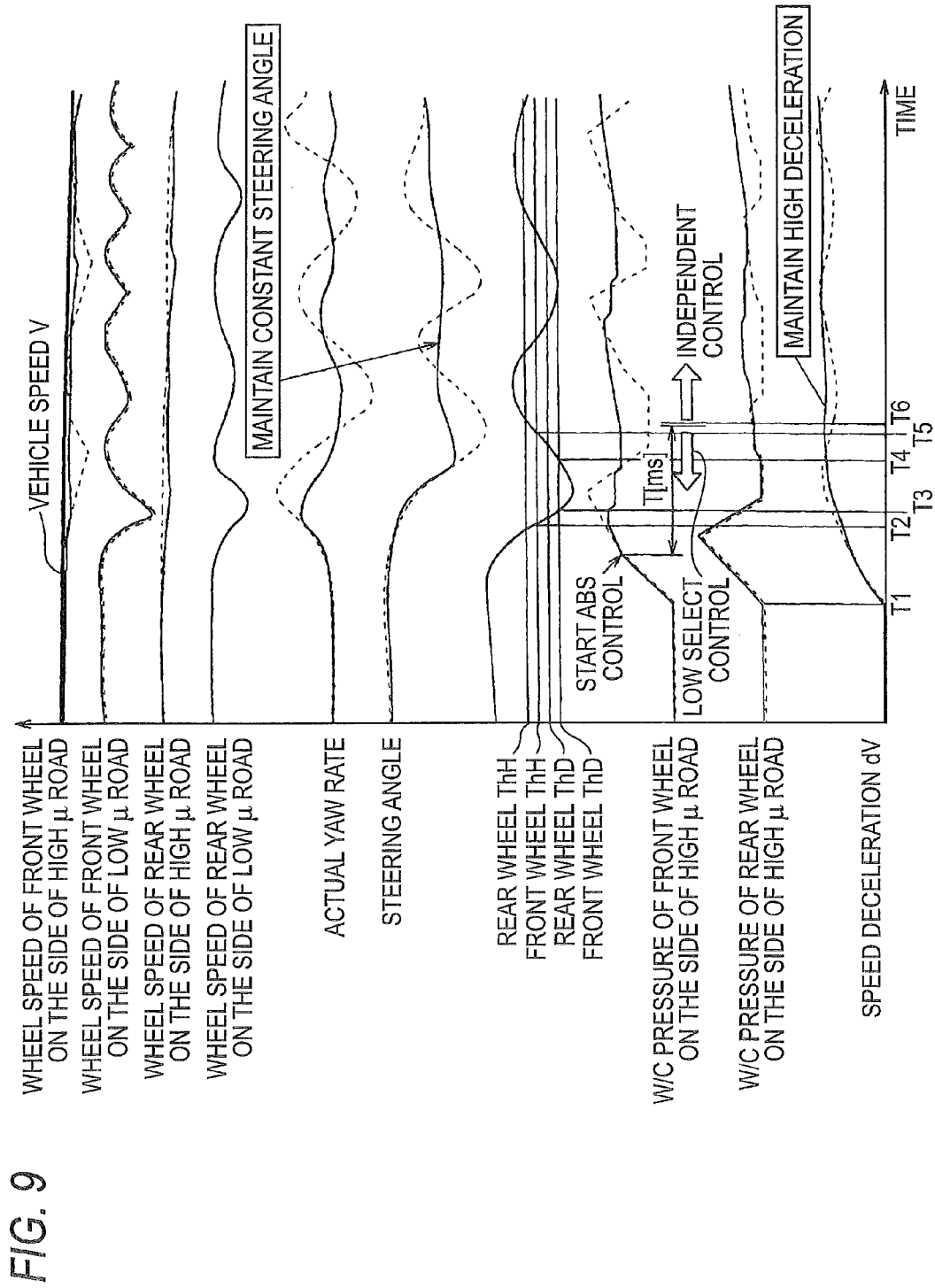
FIG. 9 is a timing chart of the case of performing an ABS control in which a split control is performed.

FIG. 9 is a timing chart of the case of performing the ABS control in which the split control as in the present illustrative embodiment is performed. Here is shown the case where the split control is performed when the brake pedal 11 is stepped during traveling the split road surface and thus yaw moment is generated. In FOG 9, a solid line indicates the case of performing the control as in the present illustrative embodiment, and a broken line indicates the case of performing only the normal ABS control of the related art.

First, when the brake pedal 11 is stepped on the split road surface, the braking force difference between the left and right wheels occurs, and thus the yaw moment begins to be generated. The wheel speed in the front and rear wheels on the side of the low μ road is lower than the vehicle speed V, and the ABS control is started. Simultaneously, the concurrent ABS control of the left and right rear wheels is set for the rear wheel on the side of the high μ road, and thereby the ABS control is started at the same time (time point T1).

Further, as the pressure increasing limitation threshold value ThH or the pressure reducing threshold value ThD, the front wheel ThD, the front wheel ThH, the rear wheel ThD, and the rear wheel ThH are calculated. When the absolute value |driftvalue| of the steering angle deviation 'driftvalue' increases due to deterioration of the vehicle stability, the absolute value |driftvalue| exceeds the front wheel ThH (time point T2). For this reason, with respect to the front wheel on the side of the high μ road, as the split control, the pressure increasing gradient limitation value KDP of the pressure increasing control in the ABS control is set, and the pressure increasing gradient is limited. Here, the absolute value |driftvalue| of the steering angle deviation 'driftvalue' also exceeds the rear wheel ThH. However, with respect to the rear wheel on the side of the high μ road, the concurrent ABS control of the left and right rear wheels has already been set, and thereby the pressure reducing control of the ABS control is in a started state.

Afterwards, when the vehicle stability is further deteriorated although the pressure increasing gradient limitation value KDP of the pressure increasing control in the ABS control is set, the absolute value |driftvalue| of the steering angle deviation 'driftvalue' becomes larger to exceed the front wheel ThD (time point T3). Thereby, the pressure reducing amount is set based on the absolute value |driftvalue| of the steering angle deviation 'driftvalue', and the pressure reducing control in the split control is performed. When the vehicle stability is improved by the pressure reducing control in this split control, the absolute value |driftvalue| of the steering angle deviation 'driftvalue' is reduced, and is smaller than the front wheel ThD again (time point T4). Then, as another split control, the pressure increasing gradient limitation value KDP of the pressure increasing control in the ABS control is set, and the pressure increasing gradient is limited. Then, the vehicle stability is still more improved (time point T5), it returns to the pressure increasing control of the normal ABS control.

Meanwhile, when a predetermined time T [ms] has lapsed after the ABS control is started (time point T6), the independent ABS control of the left and right rear wheels is set for the rear wheels. For this reason, with respect to the rear wheel on the side of the high μ road, the braking force is enhanced to such an extent that the yaw moment caused by the braking force difference between the left and right wheels is not increased. Thus, it is possible to obtain higher deceleration than the related art.

According to the ABS control in which the split control is performed as in the present illustrative embodiment as described above, as the split control, the ABS control over the front wheel on the side of the high μ road impose limitation on the pressure increasing gradient of the pressure increasing control based on the magnitude of the absolute value |driftvalue| of the steering angle deviation 'driftvalue' which serves as an index of the vehicle stability.

For this reason, it is possible to inhibit a rise gradient of the braking force of the wheels on the side of the high μ road with a good response characteristic according to the steering angle deviation 'driftvalue'. The inhibition of the rise gradient of the braking force allows the braking force difference between the left and right wheels to be inhibited. Further, since the variation itself of the W/C pressure of the front wheel on the side of the high μ road can also be inhibited, it is possible to still more inhibit the braking force difference between the left and right wheels. Thereby, it is possible to inhibit the yaw moment caused by the braking force difference between the left and right wheels. Thus, it is possible to improve the vehicle instability on the split road surface with a good response characteristic. In this manner, since the yaw moment caused by the braking force difference between the left and right wheels can be inhibited, the corrected steering by a driver for offsetting the yaw moment can be reduced. For this reason, as can be seen from the steering angle or the yaw rate of FIG. 9, since the yaw moment is inhibited, it is possible to maintain a constant steering angle, and thus so that the corrected steering by the driver can be performed while maintaining its amplitude within a predetermined range.

Furthermore, in the present illustrative embodiment, with respect to the rear wheel on the side of the high μ road, the concurrent ABS control of the left and right rear wheels (so-called select low control) is not performed in all cases, but the independent ABS control of the left and right rear wheels is performed after a predetermined time T [ms] has lapsed from the start of the ABS control. For this reason, it is possible to generate a higher braking force from the rear wheel on the side of the high μ road, and thus to maintain higher deceleration.

(Second Illustrative Embodiment)

A second illustrative embodiment of the present invention will be described. The case of performing the vehicle motion control on the split road surface has been described in the first illustrative embodiment. A vehicle motion control in the event of understeer (US) will be described in the present illustrative embodiment. The overall configuration of a brake control system 1 for a vehicle which realizes the vehicle motion control of the present illustrative embodiment is similar to that of the first illustrative embodiment, and has a difference in only processing which a brake ECU 70 performs. Thus, only the parts different from the first illustrative embodiment will be described.

Figure 10:
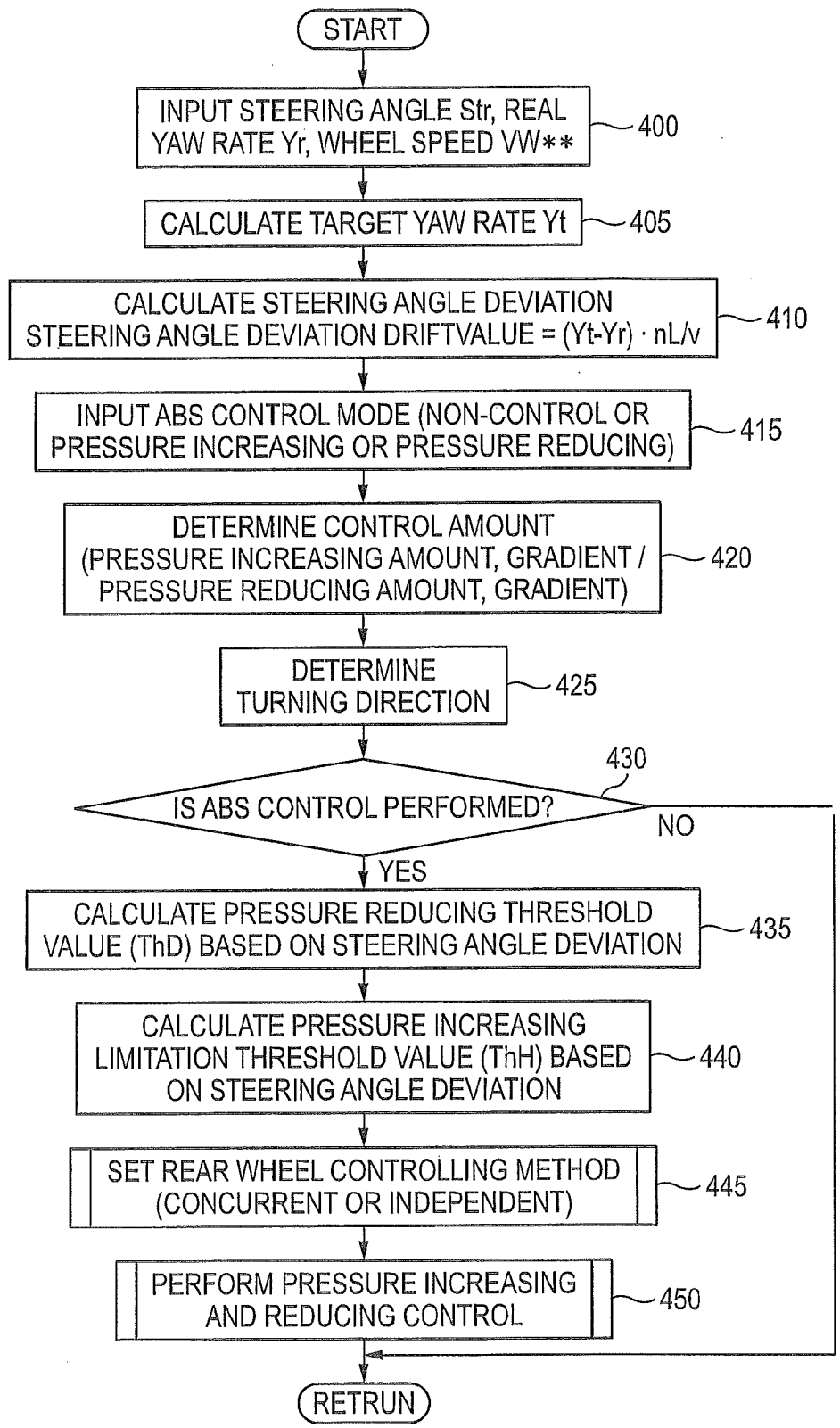
FIG. 10 is a flowchart showing details of a pressure increasing and reducing control in an ABS control according to a second illustrative embodiment of the present invention.
Figure 11:
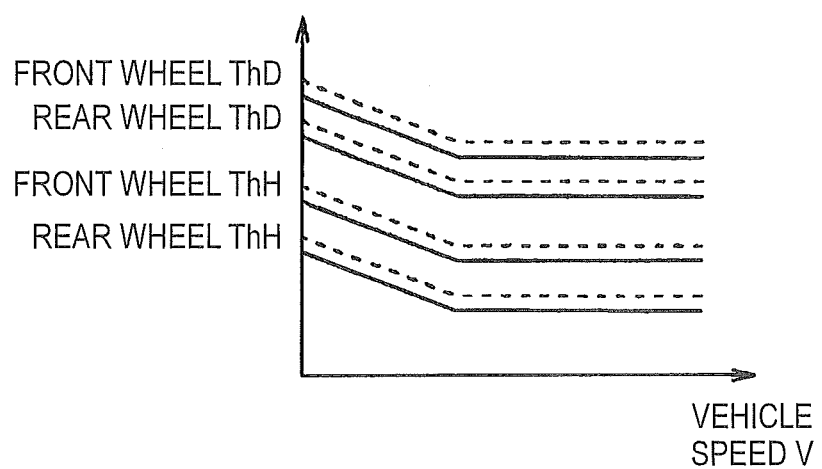
FIG. 11 is a map showing a relationship among a vehicle speed V, a pressure reducing threshold value ThD, and a pressure increasing limitation threshold value ThH.

FIG. 10 is a flowchart showing details of a pressure increasing and reducing control in an ABS control which a brake ECU 70 performs.

First, as steps 400 through 420, the processing as in steps 100 through 120 of FIG. 3 described in the first illustrative embodiment is performed. In step 425, the determination of a turning direction is performed. This determination is performed based on one of positive and negative values which is a steering angel Str calculated in step 400. For example, if the steering angel Str has the positive value in the event of left turn, and if the steering angel Str has the negative value in the event of right turn, it is determined to be the left turn when the steering angel Str≧0, and the right turn when the steering angel Str<0.

Afterwards, it proceeds to step 430, and it is determined whether the ABS control is being performed by the same manner as in step 135 of FIG. 3. If the determination is YES, calculations of a pressure reducing threshold value ThD and a pressure increasing limitation threshold value ThH are sequentially performed based on a steering angle deviation 'driftvalue' in steps 435 and 440.

The method of calculating the pressure reducing threshold value ThD and the pressure increasing limitation threshold value ThH is the same as in steps 140 and 145 of FIG. 3 described in the first illustrative embodiment. That is, in the present illustrative embodiment, when the ABS control is performed in the event of the US during a turn, a pressure reducing control or a pressure increasing limitation is performed as a control corresponding to that situation (hereinafter, referred to as "turn US specific control"). In the case of the present illustrative embodiment, the pressure reducing threshold value ThD is a threshold value for determining whether the pressure reducing control starts to be performed in the turn US specific control, and the pressure increasing limitation threshold value ThH is a threshold value for determining whether the pressure increasing limitation starts to be performed in the turn US specific control. To determine whether the pressure increasing gradient limitation or the pressure reducing control starts to be performed in the pressure increasing control, the pressure increasing limitation threshold value ThH or the pressure reducing threshold value ThD is set.

Specifically, as the pressure increasing limitation threshold value ThH or the pressure reducing threshold value ThD, a front wheel ThD, a front wheel ThH, a rear wheel ThD, and a rear wheel ThH are calculated. For example, the front wheel ThD, the front wheel ThH, the rear wheel ThD, and the rear wheel ThH may increase as a vehicle speed V is larger when the vehicle speed V is smaller than the threshold value, and are constant when the vehicle speed V larger than the threshold value, as in a map showing a relationship among the vehicle speed V, the pressure reducing threshold value ThD, and the pressure increasing limitation threshold value ThH. Since the vehicle stability is high when the vehicle speed V is low, transition to the turn US specific control is delayed by setting high values for the front wheel ThD, the front wheel ThH, the rear wheel ThD, and the rear wheel ThH such that a higher braking force is obtained. However, the front wheel ThD, the front wheel ThH, the rear wheel ThD, and the rear wheel ThH are set to a small value compared to the value set for the split control indicated by the broken line in the figure. Meanwhile, the reason why the value is set to be smaller than the value for the split control is that the value set for the split control is originally set to a large value. When the value set for the split control is used to inhibit the US, strong US feeling is given to a driver, the front wheel ThD, the front wheel ThH, the rear wheel ThD, and the rear wheel ThH have a smaller value than the value set for the split control such that the US is inhibited it its early stage.

Accordingly, the calculations of the pressure reducing threshold value ThD and the pressure increasing limitation threshold value ThH ends. Then, it proceeds to step 445, and a rear wheel controlling method is set.

Figure 12:
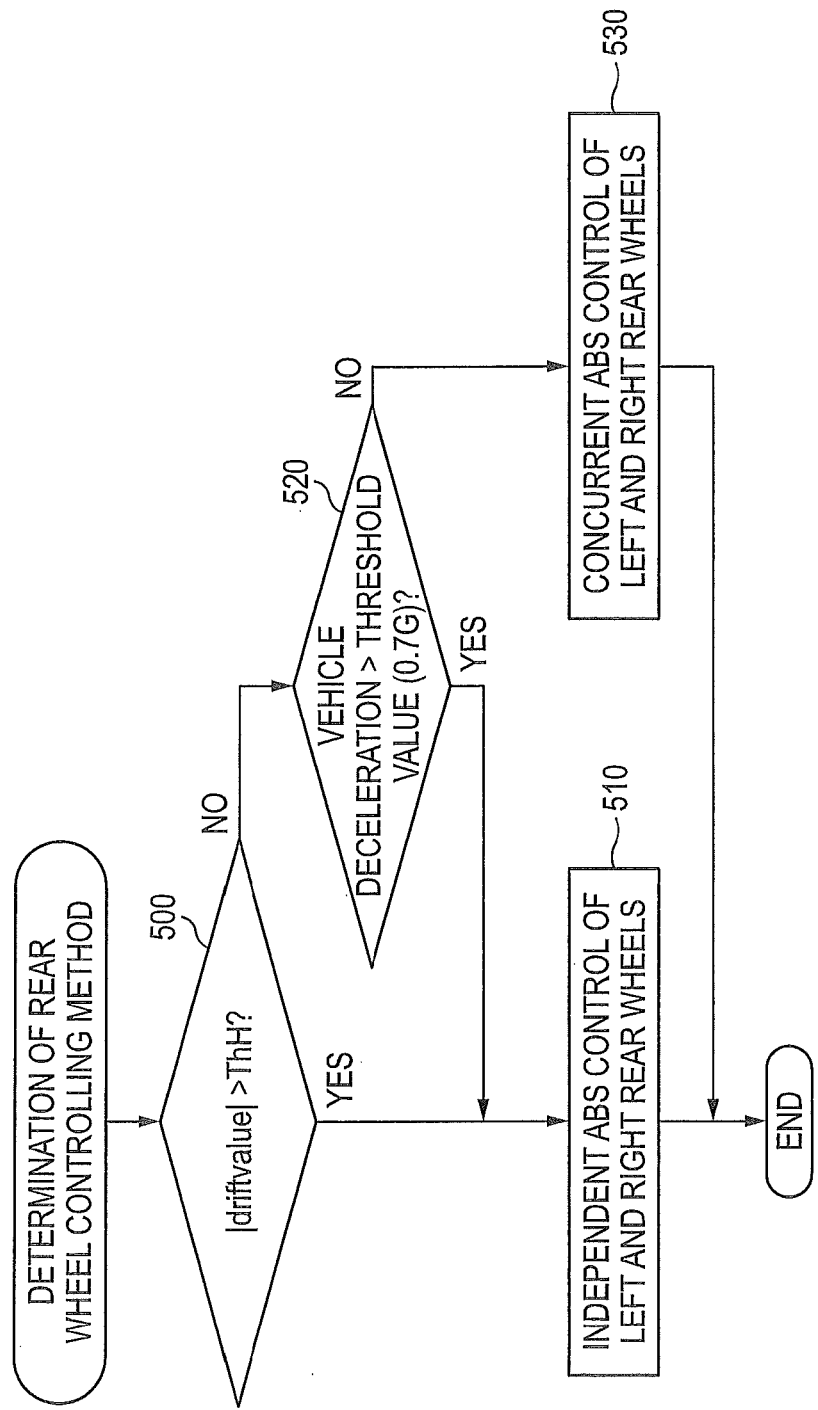
FIG. 12 is a flowchart showing details of a rear wheel controlling method.

That is, the rear wheels RL and RR have a high contribution to the vehicle stability. In connection with the rear wheels RL and RR, the control associated with the left and right wheels is performed to further improve the vehicle stability. This processing will be described with reference to FIG. 12. FIG. 12 is a flowchart showing details of a rear wheel controlling method.

As shown in the figure, in step 500, it is determined whether the absolute value |driftvalue| of the steering angle deviation 'driftvalue' exceeds the threshold value ThH. This processing is determined based on the rear wheel ThH set in step 440 mentioned above, and thus it is determined whether the absolute value |driftvalue| of the steering angle deviation 'driftvalue' exceeds the rear wheel ThH. That is, to inhibit the US in the event of a turn, it is preferable to more effectively generate a braking force for the outer rear wheel when turned. To this end, it is detected that the absolute value |driftvalue| of the steering angle deviation 'driftvalue' exceeds the rear wheel ThH, and thereby it is determined whether or not it is necessary to inhibit the US. Here, the determination is YES, it proceeds to step 510, and an independent ABS control of the left and right rear wheels which independently performs the ABS control on the left and right rear wheels RL and RR is set. Thereby, it is possible to independently generate the braking force for the outer rear wheel when turned independently of the inner rear wheel when turned.

Further, if the determination is NO, it proceeds to step 520. Like step 240 of FIG. 4 described in the first illustrative embodiment, it is determined whether vehicle deceleration dV exceeds a threshold value (e.g., 0.7 G). Thereby, it is determined whether a traveling road surface is a high μ road. If the traveling road surface is the high μ road, it proceeds to step 510, and the independent ABS control of the left and right rear wheels is set. If the traveling road surface is the low μ road, it proceeds to step 530, the concurrent ABS control of the left and right rear wheels is set.

In this manner, the related art is configured such that the independent ABS control of the left and right rear wheels is performed only in the case of the high μ road, while the present illustrative embodiment is configured such that the independent ABS control of the left and right rear wheels is performed on the high μ road as well as the event of the US. Thus, in comparison with the case of performing the concurrent ABS control of the left and right rear wheels on the rear wheels RL and RR, the ABS control is performed at a high slip rate closer to a μ peak, so that it is possible to obtain a higher braking force.

Figure 13:
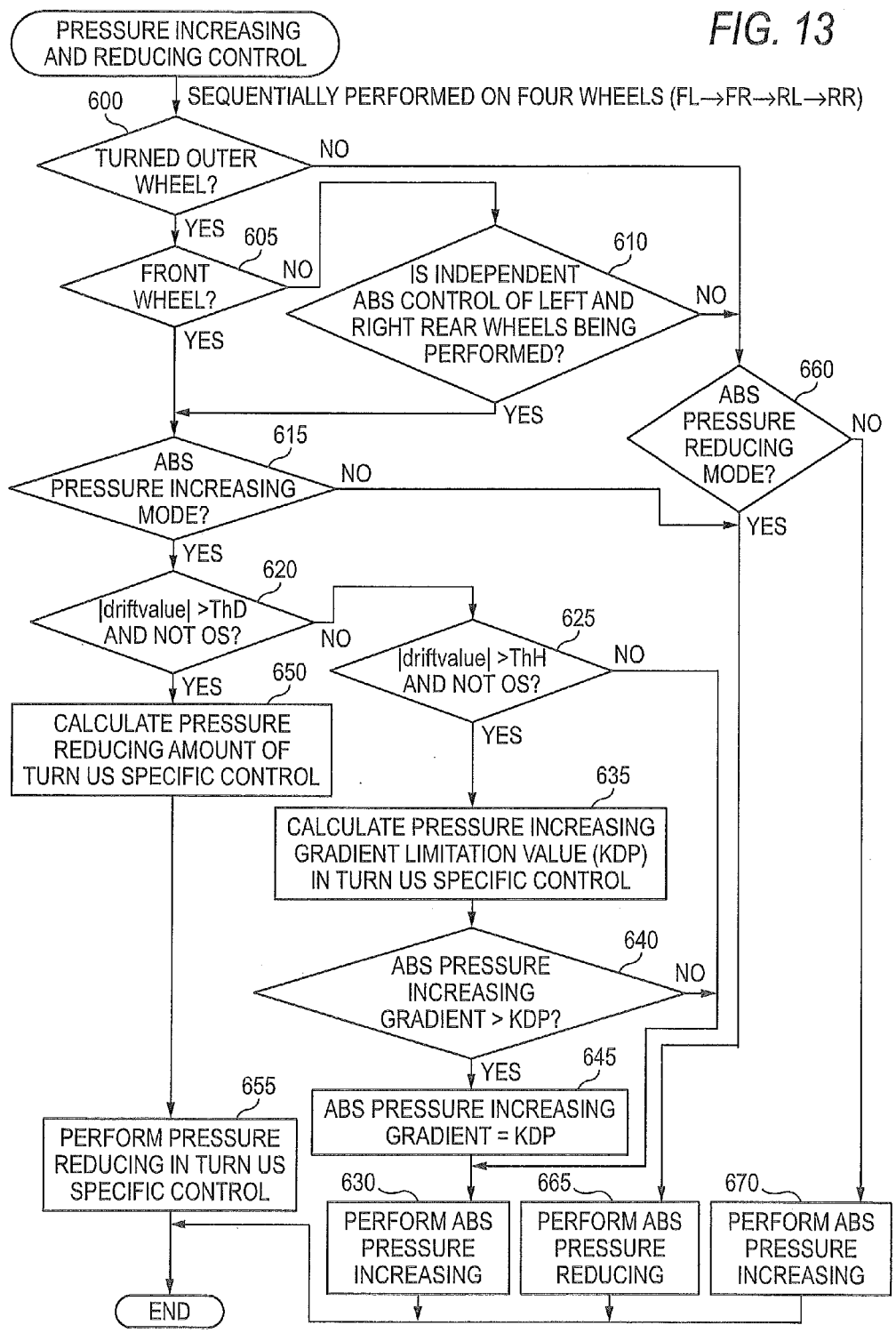
FIG. 13 is a flowchart showing details of a pressure increasing and reducing control.

Thereby, when the rear wheel controlling method ends, it proceeds to step 450, and a pressure increasing and reducing control is performed. This processing will be described with reference to FIG. 13. FIG. 13 is a flowchart showing details of a pressure increasing and reducing control. The pressure increasing and reducing control is individually performed on the wheels FL through RR, particularly from the front wheel FL to the rear wheel RR in turn.

First, in step 600, it is determined whether a control target wheel is a turned outer wheel. This determination is performed based on the turning direction determined in step 425 of FIG. 10. If the turning direction is a right turn, it is determined that the left front and rear wheels are the turned outer wheels. If the turning direction is a left turn, it is determined that the right front and rear wheels are the turned outer wheels. In the case where the determination is YES, the processing in steps 605 through 615 is performed as in steps 305 through 315 of FIG. 6 described in the first illustrative embodiment, and then it proceeds to step 620.

In step 620, as in step 320 of FIG. 6, it is determined whether the absolute value |driftvalue| of the steering angle deviation 'driftvalue' exceeds the pressure reducing threshold value ThH set in step 435 of FIG. 10, and at the same time, it is determined whether an oversteer (hereinafter, abbreviated to "OS") occurs. The determination regarding whether the absolute value |driftvalue| of the steering angle deviation 'driftvalue' exceeds the pressure reducing threshold value ThH is the same as in step 320 of FIG. 6. The determination regarding whether the OS occurs may be performed based on whether a transverse skid angle or transverse skid angular velocity, which is obtained by any known technique, is in accord with an index of the OS previously obtained by, for instance, a test.

Here, if both are determined to be NO at step 620, it proceeds to step 625, and it is determined whether the absolute value |driftvalue| of the steering angle deviation 'driftvalue' exceeds the pressure reducing limitation threshold value ThH set in step 440 of FIG. 10, and at the same time, it is determined whether the OS occurs. The determination regarding whether the absolute value |driftvalue| of the steering angle deviation 'driftvalue' exceeds the pressure reducing limitation threshold value ThH is the same as in step 325 of FIG. 6. The determination regarding whether the OS occurs may be performed by a technique as in step 620. Here, if the determination is NO, it proceeds to step 630.

In these steps 620 and 625, when it is short after the brake pedal 11 is stepped during turning, the determination would be NO. This occurs in the sequence of a gradual increase in slip rate during turning, a decrease in transverse force, a tendency toward the US, and an increase in vehicle instability, and the absolute value |driftvalue| of the steering angle deviation 'driftvalue' is not so large in the beginning when the braking force is generated.

Thus, when it is short after the brake pedal 11 is stepped during turning, it proceeds to step S630 without the pressure increasing gradient being limited, and the pressure increasing control is performed in the ABS control. Thereby, with respect to the turned outer wheels, the W/C pressure is increased, and the braking force is increased.

Thereby, when the braking force of the turned outer wheels is increased, the slip rate is increased, the transverse force gets reduced to show a tendency toward the US, and the resulting yaw moment becomes large. Thereby, the absolute value |driftvalue| of the steering angle deviation 'driftvalue' exceeds the pressure increasing limitation threshold value ThH. For this reason, the determination in step 625 is YES, and it proceeds to step 635 and the following steps. The pressure increasing limitation is performed in the turn US specific control.

Specifically, in step 635, a pressure increasing gradient limitation value KDP in the split control is calculated. The calculation of this pressure increasing gradient limitation value KDP is the same as in step 335 of FIG. 6. For example, the pressure increasing gradient limitation value KDP may be calculated using the map shown in FIG. 7.

When the pressure increasing gradient limitation value KDP is set, steps 640 and 650 perform the same processing as in steps 340 and 345. Afterwards, it proceeds to step 630, and the pressure increasing control is performed in the ABS control. Thereby, the timing of pulse rise or a time to carry out the pulse rise in the pressure increasing control is adjusted so as to be a pressure increasing gradient set at that time.

Thereby, the pressure increasing control in the typical ABS control or the turn US specific control is performed. With the respect to the turned outer wheels (but, with respect to the rear wheels, in the case where the independent ABS control of the left and right rear wheels is being performed), this pressure increasing control is repeated until the absolute value |driftvalue| of the steering angle deviation 'driftvalue' exceeds the pressure reducing threshold value ThD for a period when the pressure increasing mode of the ABS control is set.

Meanwhile, when the absolute value |driftvalue| of the steering angle deviation 'driftvalue' is further increased although the pressure increasing gradient limitation is applied in the pressure increasing control, the determination in step 620 is YES. In this case, it proceeds to step 350 and the following steps, and the pressure reducing control is performed in the turn US specific control. In particular, in step 650, a pressure reducing amount of the pressure reducing control in the turn US specific control is calculated. As a technique for calculating the pressure reducing amount, the same technique as in step 350 of FIG. 6 may be used, For example, the pressure reducing amount may be calculated using the map shown in FIG. 8.

When the pressure reducing amount is set, it proceeds to step 655, and pressure reduction of the pressure reducing control is performed in the turn US specific control. Here, the pressure reduction is performed by adjusting a pressure reducing time so as to be the pressure reducing amount calculated in step 650. Thereby, the pressure reducing control is performed in the turn US specific control. With respect to the turned outer wheels (but, with respect to the rear wheels, in the case where the independent ABS control of the left and right rear wheels is being performed), the pressure reducing control in this turn US specific control is repeated until the vehicle stability is improved to such an extent that the absolute value |driftvalue| of the steering angle deviation 'driftvalue' is smaller than the pressure reducing threshold value ThD for a period when the pressure increasing mode of the ABS control is set.

Further, in step 600 mentioned above, if it is determined that the wheels are not the turned outer wheels, it proceeds to step 660, and it is determined whether the pressure reducing mode of the ABS control is set. This case is set for the ABS control over the turned inner wheels. As such, if the determination is YES, it proceeds to step 665, and pressure reduction of the pressure reducing control in the typical ABS control is performed. If the determination is NO, it proceeds to step 670, and pressure increase of the pressure increasing control in the typical ABS control is performed.

Accordingly, the pressure increasing and reducing control processing of step 450 of FIG. 10 ends, and the pressure increasing and reducing controls in the ABS control which the brake ECU 70 performs ends.

In this manner, in the event of the US, the turn US specific control such as the split control is performed, so that the vehicle unstablility in the event of the US can be improved with a good response characteristic, and the corrected steering by a driver can be performed while maintaining the amplitude thereof within a predetermined range.

(Other Illustrative Embodiments)

In the first illustrative embodiment, on processing the pressure increasing limitation of the pressure increasing control in the split control, the larger the absolute value |driftvalue| of the steering angle deviation 'driftvalue', the smaller the pressure increasing gradient limitation value KDP in inverse proportion to the absolute value. However, it is not essential of the pressure increasing gradient limitation value KDP to be in inverse proportion to the absolute value |driftvalue|. For example, when the absolute value |driftvalue| is increased, the pressure increasing gradient limitation value KDP may be reduced step by step.

Similarly, on processing the pressure reducing control in the split control, the larger the absolute value |driftvalue| of the steering angle deviation 'driftvalue', the larger the pressure reducing amount in proportion to the absolute value. However, it is not essential of the pressure reducing amount to be in proportion to the absolute value |driftvalue|. For example, when the absolute value |driftvalue| is increased, the pressure reducing amount may be reduced step by step.

Further, the above-mentioned illustrative embodiment, the pressure increasing limitation of the pressure increasing control of the ABS control or the pressure reducing amount of the pressure reducing control is set in the split control based on the absolute value |driftvalue| of the steering angle deviation 'driftvalue'. However, since the absolute value |driftvalue| corresponds to a value of calculating the difference between the target yaw rate Yt and the actual yaw rate Yr in terms of steering angle, the case where a variety of settings are performed based on the difference between the target yaw rate Yt and the actual yaw rate Yr naturally belongs to the present invention.

Furthermore, the split control in the first illustrative embodiment and the turn US specific control in the second illustrative embodiment have been described, and these controls have been described as being performed in different flows. However, both of them may be combined and processed in the same flow.

Meanwhile, the steps shown in each figure correspond to units for performing various types of processing. Specifically, among the steps of the brake ECU 70, the part for performing the processing of step 100 corresponds to a frictional coefficient calculating unit or a vehicle speed calculating unit, the part for performing the processing of step 110 corresponds to a steering angle calculating unit, the part for performing the processing of step 145 corresponds to a pressure increasing limitation threshold value setting unit, the part for performing the processing of step 150 corresponds to a pressure increasing and reducing controlling unit, and the part for performing the processing of step 230 corresponds to an independent controlling unit.

What is claimed is:

1. A vehicle motion control device having a processor which performs an anti-skid control when a predetermined anti-skid starting condition is satisfied in any of four wheels during braking of a vehicle, the anti-skid control including setting a control mode from either one of a pressure reducing mode and a pressure increasing mode based on a slip rate of each of the four wheels, and performing a pressure reducing control of reducing a wheel cylinder pressure and a pressure increasing control of increasing the wheel cylinder pressure based on the set control mode, the vehicle motion control device comprising:

a steering angle deviation calculating unit which is configured to calculate a steering angle deviation of the vehicle;

a frictional coefficient calculating unit which is configured to calculate each of road surface frictional coefficients of a traveling road surface of left wheels among the four wheels and a traveling road surface of right wheels among the four wheels;

a split determining unit which is configured to determine whether braking is performed on a split road surface where the road surface frictional coefficients between the left and right wheels are different from each other, based on a difference between the road surface frictional coefficients of the traveling road surfaces of the left wheels and the right wheels calculated by the frictional coefficient calculating unit; and a pressure increasing and reducing controlling unit which is configured to perform a split control when the pressure increasing mode is set as the control mode, the spilt control including applying a pressure increasing limitation of the pressure increasing control in the anti-skid control to a front wheel at a side of the traveling road surface having higher road surface frictional coefficient between the right and left wheels based on an absolute value of the steering angle deviation calculated by the steering angle deviation calculating unit such that a pressure increasing gradient in the pressure increasing control is smaller as the absolute value is larger.

2. The vehicle motion control device according to claim 1, further comprising:

a pressure increasing limitation threshold value setting unit which is configured to set a threshold value for determining whether the pressure increasing and reducing controlling unit starts applying the pressure increasing limitation of the pressure increasing control, as a pressure increasing limitation threshold value, wherein when the absolute value of the steering angle deviation calculated by the steering angle deviation calculating unit exceeds the pressure increasing limitation threshold value, the pressure increasing and reducing controlling unit applies the pressure increasing limitation of the pressure increasing control in the anti-skid control.

3. The vehicle motion control device according to claim 2, further comprising:

a vehicle speed calculating unit which is configured to calculate a vehicle speed of the vehicle, wherein when the vehicle speed calculated by the vehicle speed calculating unit is a threshold value or smaller, the pressure increasing limitation threshold value setting unit sets, as the pressure increasing limitation threshold value, a predetermined threshold value larger than a threshold value to be set when the vehicle speed calculated by the vehicle speed calculating unit is larger than the predetermined threshold value.

4. The vehicle motion control device according to claim 3, wherein the pressure increasing and reducing controlling unit sets a pressure increasing gradient limitation value which becomes smaller as a separation degree between the absolute value of the steering angle deviation and the pressure increasing limitation threshold value is larger, and wherein the pressure increasing and reducing controlling unit limits the pressure increasing gradient in the pressure increasing control to the pressure increasing gradient limitation value when the split control is performed.

5. The vehicle motion control device according to claim 4, wherein the pressure increasing and reducing controlling unit performs, as the split control, a pressure reducing control of reducing the wheel cylinder pressure on a front wheel at the side of the traveling road having higher road surface frictional coefficient between the left and right wheels when the pressure increasing mode is set as the control mode and when the absolute value of the steering angle deviation calculated by the steering angle deviation calculating unit exceeds a pressure reducing threshold value which is larger than the pressure increasing limitation threshold value.

6. The vehicle motion control device according to claim 5, further comprising:
an independent controlling unit which is configured to perform the anti-skid control on rear wheels among the four wheels independently between a right rear wheel and a left rear wheel when a predetermined time has elapsed after the anti-skid control is started.

7. The vehicle motion control device according to claim 6, further comprising:
a turning direction determining unit which is configured to determine a turning direction of the vehicle,
wherein the pressure increasing and reducing controlling unit performs a turn understeer specific control when the pressure increasing mode is set as the control mode, the turn understeer specific control including applying a pressure increasing limitation of the pressure increasing control in the anti-skid control to a front wheel at a turn outer side which is determined based on the turning direction determined by the turning direction determining unit, based on the absolute value of the steering angle deviation calculated by the steering angle deviation calculating unit such that the pressure increasing gradient in the pressure increasing control is smaller as the absolute value is larger.

8. The vehicle motion control device according to claim 3, wherein the pressure increasing and reducing controlling unit performs, as the split control, a pressure reducing control of reducing the wheel cylinder pressure on a front wheel at the side of the traveling road having higher road surface frictional coefficient between the left and right wheels when the pressure increasing mode is set as the control mode and when the absolute value of the steering angle deviation calculated by the steering angle deviation calculating unit exceeds a pressure reducing threshold value which is larger than the pressure increasing limitation threshold value.

9. The vehicle motion control device according to claim 3, further comprising:
an independent controlling unit which is configured to perform the anti-skid control on rear wheels among the four wheels independently between a right rear wheel and a left rear wheel when a predetermined time has elapsed after the anti-skid control is started.

10. The vehicle motion control device according to claim 2, wherein the pressure increasing and reducing controlling unit sets a pressure increasing gradient limitation value which becomes smaller as a separation degree between the absolute value of the steering angle deviation and the pressure increasing limitation threshold value is larger, and wherein the pressure increasing and reducing controlling unit limits the pressure increasing gradient in the pressure increasing control to the pressure increasing gradient limitation value when the split control is performed.

11. The vehicle motion control device according to claim 10, wherein the pressure increasing and reducing controlling unit performs, as the split control, a pressure reducing control of reducing the wheel cylinder pressure on a front wheel at the side of the traveling road having higher road surface frictional coefficient between the left and right wheels when the pressure increasing mode is set as the control mode and when the absolute value of the steering angle deviation calculated by the steering angle deviation calculating unit exceeds a pressure reducing threshold value which is larger than the pressure increasing limitation threshold value.

12. The vehicle motion control device according to claim 11, further comprising:
an independent controlling unit which is configured to perform the anti-skid control on rear wheels among the four wheels independently between a right rear wheel and a left rear wheel when a predetermined time has elapsed after the anti-skid control is started.

13. The vehicle motion control device according to claim 2, wherein the pressure increasing and reducing controlling unit performs, as the split control, a pressure reducing control of reducing the wheel cylinder pressure on a front wheel at the side of the traveling road having higher road surface frictional coefficient between the left and right wheels when the pressure increasing mode is set as the control mode and when the absolute value of the steering angle deviation calculated by the steering angle deviation calculating unit exceeds a pressure reducing threshold value which is larger than the pressure increasing limitation threshold value.

14. The vehicle motion control device according to claim 2, further comprising:
an independent controlling unit which is configured to perform the anti-skid control on rear wheels among the four wheels independently between a right rear wheel and a left rear wheel when a predetermined time has elapsed after the anti-skid control is started.

15. The vehicle motion control device according to claim 1, further comprising:
an independent controlling unit which is configured to perform the anti-skid control on rear wheels among the four wheels independently between a right rear wheel and a left rear wheel when a predetermined time has elapsed after the anti-skid control is started.

16. The vehicle motion control device according to claim 1, further comprising:
a turning direction determining unit which is configured to determine a turning direction of the vehicle,
wherein the pressure increasing and reducing controlling unit performs a turn understeer specific control when the pressure increasing mode is set as the control mode, the turn understeer specific control including applying a pressure increasing limitation of the pressure increasing control in the anti-skid control to a front wheel at a turn outer side which is determined based on the turning direction determined by the turning direction determining unit, based on the absolute value of the steering angle deviation calculated by the steering angle deviation calculating unit such that the pressure increasing gradient in the pressure increasing control is smaller as the absolute value is larger.

17. A vehicle motion control device having a processor which performs an anti-skid control when a predetermined anti-skid starting condition is satisfied in any of four wheels during braking of a vehicle, the anti-skid control including setting a control mode from either one of a pressure reducing mode and a pressure increasing mode based on a slip rate of each of the four wheels, and performing a pressure reducing control of reducing a wheel cylinder pressure and a pressure increasing control of increasing the wheel cylinder pressure based on the set control mode, the vehicle motion control device comprising:
- a steering angle deviation calculating unit which is configured to calculate a steering angle deviation of the vehicle;
- a turning direction determining unit which is configured to determine a turning direction of the vehicle; and
- a pressure increasing and reducing controlling unit which is configured to perform a turn understeer specific control when the pressure increasing mode is set as the control mode, the turn understeer specific control including applying a pressure increasing limitation of the pressure increasing control in the anti-skid control to a front wheel at a turn outer side, which is determined based on the turning direction determined by the turning direction determining unit, based on an absolute value of the steering angle deviation calculated by the steering angle deviation calculating unit such that a pressure increasing gradient in the pressure increasing control is smaller as the absolute value is larger.

18. The vehicle motion control device according to claim 17, further comprising:
- a pressure increasing limitation threshold value setting unit which is configured to set a threshold value for determining whether the pressure increasing and reducing controlling unit starts applying the pressure increasing limitation of the pressure increasing control, as a pressure increasing limitation threshold value,
- wherein when the absolute value of the steering angle deviation calculated by the steering angle deviation calculating unit exceeds the pressure increasing limitation threshold value, the pressure increasing and reducing controlling unit applies the pressure increasing limitation of the pressure increasing control in the anti-skid control.

19. The vehicle motion control device according to claim 18, further comprising:
- a vehicle speed calculating unit which is configured to calculate a vehicle speed of the vehicle,
- wherein when the vehicle speed calculated by the vehicle speed calculating unit is a threshold value or smaller, the pressure increasing limitation threshold value setting unit sets, as the pressure increasing limitation threshold value, a predetermined threshold value larger than a threshold value to be set when the vehicle speed calculated by the vehicle speed calculating unit is larger than the predetermined threshold value.

20. The vehicle motion control device according to claim 19,
- wherein the pressure increasing and reducing controlling unit sets a pressure increasing gradient limitation value which becomes smaller as a separation degree between the absolute value of the steering angle deviation and the pressure increasing limitation threshold value is larger, and
- wherein the pressure increasing and reducing controlling unit limits the pressure increasing gradient in the pressure increasing control to the pressure increasing gradient limitation value when the turn understeer specific control is performed.

21. The vehicle motion control device according to claim 20,
- wherein the pressure increasing and reducing controlling unit performs, as the turn understeer specific control, a pressure reducing control of reducing the wheel cylinder pressure on a front wheel at the turn outer side when the pressure increasing mode is set as the control mode and when the absolute value of the steering angle deviation calculated by the steering angle deviation calculating unit exceeds a pressure reducing threshold value which is larger than the pressure increasing limitation threshold value.

* * * * *